United States Patent
Oohira

(10) Patent No.: US 9,760,292 B2
(45) Date of Patent: Sep. 12, 2017

(54) STORAGE SYSTEM AND STORAGE CONTROL METHOD

(71) Applicant: Hitachi, Ltd., Tokyo (JP)

(72) Inventor: Yoshinori Oohira, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 83 days.

(21) Appl. No.: 14/770,484

(22) PCT Filed: Jun. 13, 2013

(86) PCT No.: PCT/JP2013/066370
§ 371 (c)(1),
(2) Date: Aug. 26, 2015

(87) PCT Pub. No.: WO2014/199493
PCT Pub. Date: Dec. 18, 2014

(65) Prior Publication Data
US 2016/0004459 A1    Jan. 7, 2016

(51) Int. Cl.
G06F 3/06 (2006.01)
G06F 12/02 (2006.01)
G06F 12/16 (2006.01)

(52) U.S. Cl.
CPC .......... *G06F 3/0616* (2013.01); *G06F 3/067* (2013.01); *G06F 3/0614* (2013.01); *G06F 3/0647* (2013.01); *G06F 3/0688* (2013.01); *G06F 12/0246* (2013.01); *G06F 12/16* (2013.01); *G06F 2212/7211* (2013.01)

(58) Field of Classification Search
CPC .. G06F 3/0616; G06F 3/0688; G06F 12/0246; G06F 3/0614; G06F 3/0647; G06F 3/067; G06F 12/16; G06F 2212/7211
See application file for complete search history.

(56) References Cited

U.S. PATENT DOCUMENTS

| 2007/0079099 A1* | 4/2007 | Eguchi .................. G06F 3/0608 711/170 |
| 2011/0060885 A1 | 3/2011 | Satoyama et al. |
| 2013/0036250 A1* | 2/2013 | Hayashi .................. G06F 3/061 711/101 |
| 2015/0100728 A1 | 4/2015 | Yamamoto et al. |

FOREIGN PATENT DOCUMENTS

| WO | 2010/122674 A1 | 10/2010 |
| WO | 2011/010344 A1 | 1/2011 |

OTHER PUBLICATIONS

International Search Report of PCT/JP2013/066370.

* cited by examiner

*Primary Examiner* — Rocio Del Mar Perez-Velez
(74) *Attorney, Agent, or Firm* — Mattingly & Malur, PC

(57) ABSTRACT

In executing a balancing process for moving data between a plurality of storage device groups constituted by a plurality of storage devices, a storage system determines whether or not to execute a balancing process for satisfying a first avoidance requirement for avoiding the occurrence of a problem in any one storage device only, on the basis of a second avoidance requirement which is satisfied by a second balancing process executed prior to a first balancing process for satisfying the first avoidance requirement, and executes the first balancing process in a case where the result of this determination is affirmative.

8 Claims, 31 Drawing Sheets

Fig. 6

Virtual - logical address conversion table 301

| Page number 501 | Virtual volume number 502 | Virtual address 503 | Pool number 504 | Group number 505 | Logical address 506 |
|---|---|---|---|---|---|
| 1 | 1 | 0x0000 | 1 | 3 | 0x0040 |
| 2 | 1 | 0x0010 | 1 | 1 | 0x0050 |
| 3 | 2 | 0x0000 | 1 | 3 | 0x0020 |
| 4 | 2 | 0x0010 | 1 | 2 | 0x0040 |
| 5 | 2 | 0x0020 | 1 | 1 | 0x0010 |
| ... | ... | ... | ... | ... | ... |

| Group number 601 | RAID type 602 | Physical drive number 603 |
|---|---|---|
| 1 | RAID5 | 1000 |
| | | 1001 |
| | | 1002 |
| | | 1003 |
| 2 | RAID1 | 1004 |
| | | 1005 |

Logical - physical address conversion table 302

Fig. 8

Avoidance requirement information table — 303

| Name of avoidance requirement (901) | Priority order (902) | Execution status (903) | Completion time (904) |
|---|---|---|---|
| Write balancing | 1 | Completed | 2013/01/21 11:21 |
| I/O load balancing | 2 | Not completed | 2013/01/21 12:41 |
| Consumption balancing | 3 | Not completed | 2013/01/21 17:39 |
| ... | ... | ... | ... |

Balance information table — 308

| Group number 1001 | Upper limit indicator 1002 | | Plan indicator 1003 | |
|---|---|---|---|---|
| | Maximum write value 1011 | Maximum I/O value 1012 | Planned write value 1013 | Planned I/O value 1014 |
| 1 | 500 | 1000 | 200 | 1000 |
| 2 | 500 | 1000 | 120 | 500 |
| 3 | 40 | NULL | 30 | NULL |
| ... | ... | ... | ... | ... |

(1000, 1000, 1000 annotations point to Planned I/O value column)

Fig. 10

Page monitor information table — 304

| Page number 1301 | Page write value 1302 | Page I/O value 1303 | Page consumption 1304 |
|---|---|---|---|
| 1 | 1000 | 1500 | 200 |
| 2 | 200 | 400 | 200 |
| 3 | 0 | 20 | 50 |
| 4 | 5 | 5 | 4 |
| 5 | 50 | 50 | 50 |
| ... | ... | ... | ... |

Group monitor information table — 305

| Group number 1401 | Group write value 1402 | Group I/O value 1403 | Group consumption 1404 |
|---|---|---|---|
| 1 | 2000 | 4000 | 750 |
| 2 | 1000 | 3000 | 750 |
| 3 | 700 | 2000 | 500 |
| ... | ... | ... | ... |

Write characteristics table — 306a

| Page write value division | Number of pages | Total page write value |
|---|---|---|
| 0~100 | 100 | 5000 |
| 100~200 | 50 | 7500 |
| 200~300 | 4 | 1000 |
| ... | ... | ... |

I/O load characteristics table — 306b

| Page I/O value divisions (2001) | Number of pages (2002) | Total page I/O value (2003) | Total page write value (2004) |
|---|---|---|---|
| 0~100 | 100 | 5400 | 2500 |
| 100~200 | 50 | 6450 | 2500 |
| 200~300 | 4 | 1024 | 176 |
| ... | ... | ... | ... |

Fig. 14

Schedule information table — 307

| Movement source group number 1601 | Movement type 1602 | Movement threshold value 1603 | Movement destination group number 1604 | Number of pages scheduled for movement 1605 | Number of moved pages 1606 |
|---|---|---|---|---|---|
| 1 | Outflow | (Minimum) 100 | 2 | 100 | 100 |
|   |         |                | 3 | 70  | 50  |
| 2 | Inflow  | (Maximum) 450  | 1 | 100 | 50  |
|   |         |                | 3 | 50  | 50  |
| 3 | Outflow | (Minimum) 100  | 1 | 70  | 35  |
|   |         |                | 2 | 50  | 29  |

(rows marked 1600)

Fig. 27

Relative indicator information table ~ 309

| Group number 2201 | Confirmation flag 2202 | Current relative indicator value 2203 | Previous relative indicator value 2204 |
|---|---|---|---|
| 1 | Required | 0.5 | 0.8 |
| 2 | Not required | 0.4 | 0.3 |
| 3 | Required | 0.2 | 0.1 |
| ... | ... | ... | ... |

(2200, 2200, 2200)

STORAGE SYSTEM AND STORAGE CONTROL METHOD

TECHNICAL FIELD

The present invention relates to control of the arrangement of data in a storage system.

BACKGROUND ART

A storage device having a flash memory (called "flash device" below) can be rewritten a limited number of times. Therefore, technology is known for extending the useful life of flash devices in the whole of a storage system provided with a plurality of flash devices, by moving data between the flash devices (PTL 1).

In a storage system, if access operations are concentrated in any one of the storage devices, the performance of the storage device creates a bottleneck in the whole storage system. Therefore, technology is known for preventing the occurrence of bottlenecks of this kind by moving data between storage devices in a storage system.

Technology is also known for equalizing the consumed amount of storage capacity between storage devices, by moving data between storage devices, in a storage system (PTL 2).

CITATION LIST

Patent Literature

[PTL 1]
WO 2011/010344
[PTL 2]
WO 2010/122674

SUMMARY OF INVENTION

Technical Problem

In general, a storage system has a plurality of storage devices, but there is a requirement to avoid the occurrence of a problem in any one storage device of the plurality of storage devices (the occurrence of a local problem). Below, a requirement of this kind is called an "avoidance requirement". Local problems relating to avoidance requirements include problems from various perspectives. More specifically, examples of avoidance requirements that can be envisaged are: a requirement to avoid shortening of the useful life of any one flash device only (life avoidance requirement), a requirement to avoid concentration of access at any one flash device only (bottleneck avoidance requirement), and a requirement to avoid large consumption of the storage capacity of any one storage device only (consumption avoidance requirement).

If only one of these three avoidance requirements applies, then the requirement can be satisfied by applying the technologies described above.

However, it is difficult to satisfy two or more avoidance requirements of a plurality of avoidance requirements including the three mentioned above.

Solution to Problem

The storage system relating to one embodiment of the invention comprises: a plurality of storage device groups constituted by a plurality of storage devices forming bases for a plurality of storage areas; and a controller which is coupled to the plurality of storage device groups and is configured to execute a balancing process for moving data between storage areas based on different storage device groups. The controller determines whether or not to execute a balancing process for satisfying a first avoidance requirement of a plurality of avoidance requirements for avoiding the occurrence of a problem in any one storage device only of the plurality of storage devices. This determination is made on the basis of a second avoidance requirement of the plurality of avoidance requirements which is satisfied by a second balancing process executed prior to a first balancing process for satisfying the first avoidance requirement. The controller executes the first balancing process in a case where a result of the determination is affirmative.

Advantageous Effects of Invention

In a storage system, two or more avoidance requirements, among a plurality of avoidance requirements, can be satisfied in parallel.

BRIEF DESCRIPTION OF DRAWINGS

FIG. 6 shows an example of the configuration of a virtual-logical address conversion table.

FIG. 7 shows an example of the configuration of a logical-physical address conversion table.

FIG. 8 shows an example of the configuration of an avoidance requirement information table.

FIG. 9 shows an example of the configuration of a balance information table.

FIG. 10 shows an example of the configuration of a page monitor information table.

FIG. 11 shows an example of the configuration of a group monitor information table.

FIG. 12 shows an example of the configuration of a group characteristics information table for write balancing.

FIG. 13 shows an example of the configuration of a group characteristics information table for I/O balancing.

FIG. 14 shows an example of the configuration of a schedule information table.

FIG. 27 shows an example of the configuration of a relative indicator information table.

DESCRIPTION OF EMBODIMENTS

Figure 1:
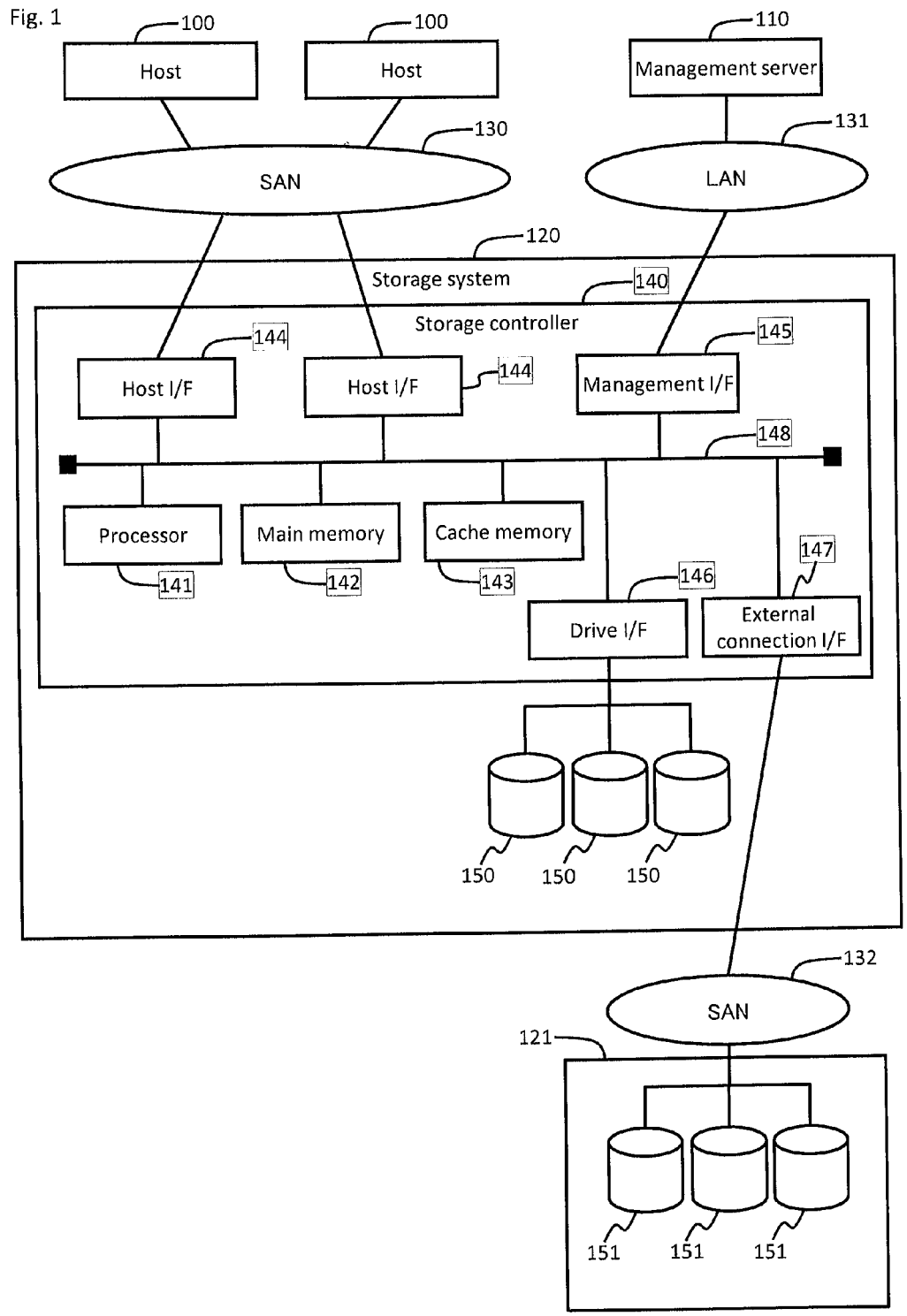
FIG. 1 is a block diagram showing a configuration of a computer system including a storage system relating to a first embodiment of the invention.

Several embodiments of the invention are described below. In the explanation given below, information is described using the expression "aaa table", and the like, but this information may also be expressed in a form other than a data structure such as a table. Therefore, in order to indicate that there is no dependence on the data structure, the term "aaa information" is also used for "aaa table", or the like. Furthermore, when explaining the details of each entry of information, an identifying term such as "number" or "name" is employed, but identifying information of other types may be used.

Furthermore, in the description given below, a "program" is given as the subject, but since predetermined processing is carried out using a memory and communications port (network I/F) by a processor executing the program, then the description may also be taken as one in which a processor is the subject. Moreover, the processing disclosed using a program as the subject may also be taken to be processing that is carried out by a computer, such as a monitoring system. Furthermore, all or a portion of the program may be realized by dedicated hardware. Moreover, programs of various types may be installed in various computers by a program delivery server, or a computer-readable storage medium.

Furthermore, in the description given below, the reference numerals of a plurality of elements of the same type are a combination of the same principal number with different suffix numerals. Where elements are described without distinguishing between the elements of the same type, then only the principal number of the reference numeral is used, and where a distinction is to be made between elements of the same type, the whole reference numeral is used.

First Embodiment

FIG. 1 is a block diagram showing a configuration of a computer system including a storage system 120.

The computer system includes a host 100, a management server 110, a storage system 120 and an external storage system 121.

The host 100 is a computer which carries out work by using data stored in the storage system 120. The host 100 is coupled to the storage system 120 by a communications network 130 capable of two-way data communications. The communications network 130 is a SAN (Storage Area Network), for example, which is composed by a FC (Fibre Channel) or an Ethernet (registered trademark), etc.

The management server 110 is a computer which manages the storage system 120. The management server 110 is provided with an interface device for a user (for example, a mouse, a keyboard, display, etc.). The management server 110 is coupled to the storage system 120 by a communications network 131 capable of two-way data communications. The communications network 131 is composed by a LAN (Local Area Network), for example. The communications network 131 and the communications network 130 may be a single communications network. A user can manage the storage system 120 using the management server 110.

The storage system 120 has a plurality of storage devices 150, and a storage controller 140 which is coupled in communicable fashion to the plurality of storage devices 150 and which controls data transfer, and the like, between the host 100 and the storage devices 150. There may be a plurality of storage controllers 140.

The storage devices 150 are composed by non-volatile storage media, such as SSDs (Solid State Drives) or HDDs (Hard Disk Drives), or the like, for example. In other words, the storage devices 150 are typically non-volatile storage devices.

The storage controller 140 is provided with a processor 141, a main memory 142, a cache memory 143, a host I/F 144, a management I/F 145, a drive I/F 146 and an external connection I/F 147. There may be two or more of each of the devices 141 to 147. The devices 141 to 147 are coupled together by an internal network 148 which permits two-way data communications.

The processor 141 achieves various functions of the storage system 120 by executing a computer program. For example, the processor 141 executes a program for achieving a request (command) from a host 100. For instance, the processor 141 executes a program for providing a virtual volume 410 to the host 100. A portion of the functions of the storage controller 140 may be achieved by using a prescribed computing circuit.

The main memory 142 stores data and programs, or the like, which are used by the processor 141.

The cache memory 143 temporarily stores (caches) data which is read from or written to the storage devices 150.

The main memory 142 and the cache memory 143 are composed by a volatile storage medium, such as a DRAM (Dynamic Random Access Memory), or the like, for example.

The host I/F 144 controls data communications between the storage controller 140 and the host 100. The host I/F 144 controls data communications on the basis of SAN standards, for example.

The management I/F 145 controls data communications between the storage controller 140 and the management server 110. The management I/F 145 controls data communications on the basis of Ethernet (registered trademark) standards, for example. The drive I/F 146 controls data communications between the storage controller 140 and the storage devices 150. The drive I/F 146 controls data communications on the basis of FC, SAS or SATA standards, or the like, for example.

The external connection I/F 147 controls data communications between the storage controller 140 and the external storage system 121. For example, if the storage system 120 and the external storage system 121 are coupled by a communications network 132 based on a SAN, the external connection I/F 147 controls data communications on the basis of SAN standards. The communications network 130 and the communications network 132 may be a single communications network.

Figure 2:
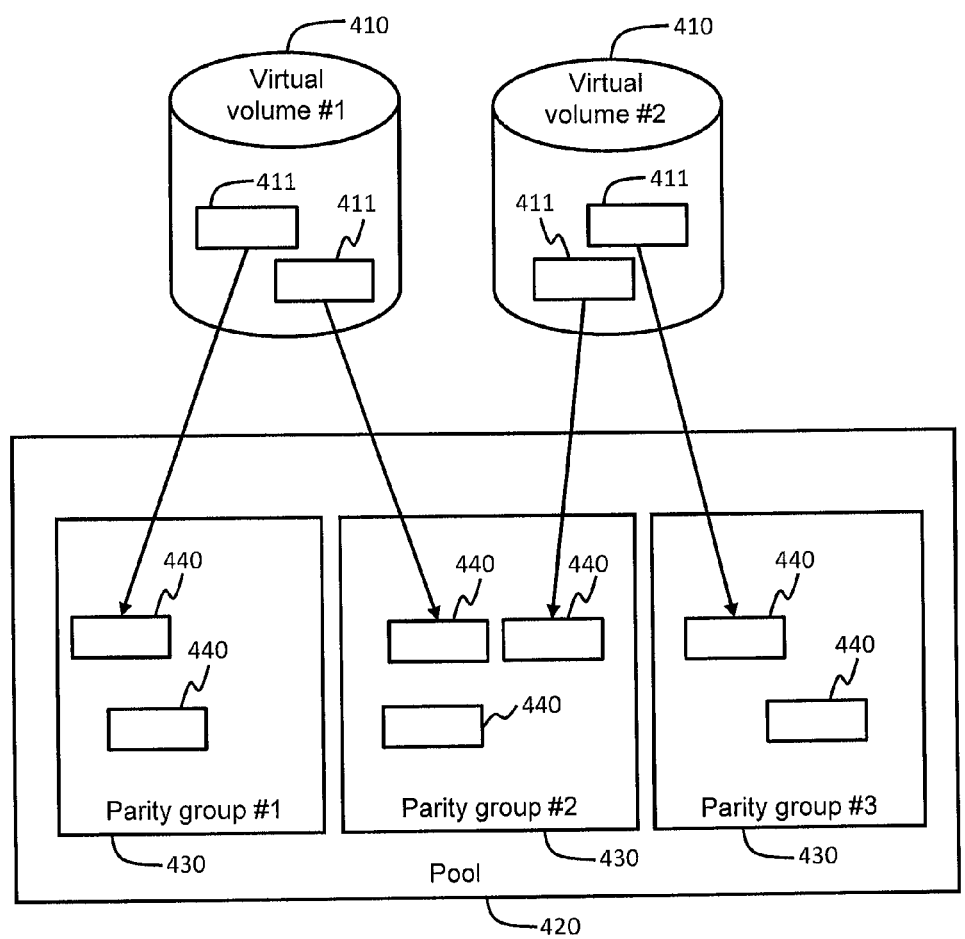
FIG. 2 is a schematic drawing showing a relationship between a virtual volume and a storage system.

FIG. 2 is a schematic drawing showing a relationship between a virtual volume 410 and a storage system 120.

The plurality of storage devices 150 have a plurality of parity groups 430. The parity groups 430 are composed by two or more storage devices 150. The parity groups 430 may also be called RAID (Redundant Arrays of Inexpensive Disks) groups, and store data in accordance with a designated RAID level.

The plurality of parity groups 430 may be, for example, three parity groups #1, #2 and #3. A pool 420 is formed on the basis of the three parity groups #1, #2 and #3. The pool 420 is a collection of a plurality of logical storage areas (called "pages" below) 440. The storage controller 140 manages the space of the logical storage areas of the parity group 430 by dividing the space into a plurality of pages 440.

The storage controller 140 presents a virtual volume 410 to the host 100. The storage controller 140 manages the virtual volume 410 by dividing the virtual volume 410 into a plurality of storage areas (called "virtual areas" below) 411. The virtual volume 410 is a virtual logical volume.

The virtual volume 410 is recognized as a logical volume by the host 100. For example, upon receiving a write command from the host 100 to a virtual address belonging to the virtual area 411, the storage controller 140 identifies an unused page 440, from the pool 420, and allocates this unused page 440 to the virtual area 411. The storage controller 140 writes the write target data in accordance with the write command, to the allocated page 440.

Figure 3:
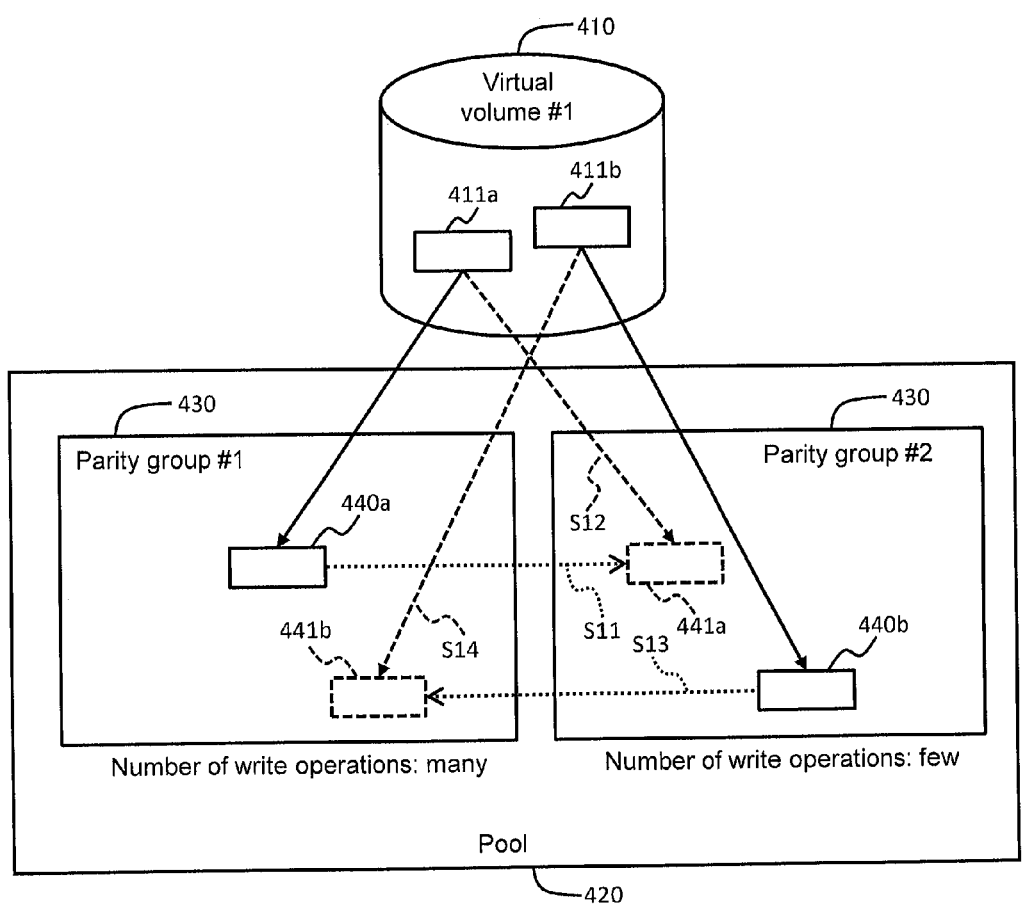
FIG. 3 is a schematic drawing for describing a balancing process which evens out the number of rewrites between parity groups.

FIG. 3 is a schematic drawing for describing a balancing process which evens out the number of rewrites between parity groups 430.

The storage media in the storage devices 150 may be non-volatile memories. A non-volatile memory is a recordable memory, and may be, for example, a flash memory, an MRAM (Magnetic Random Access Memory), a PRAM (Phase Change Random Access Memory), a ReRAM (Resistance Random Access Memory), or the like.

If the storage media in the storage devices 150 are flash memories, then the flash memories are composed by a plurality of blocks, and each block is composed by a plurality of pages. The pages are I/O units and are different targets to the "pages" which are unit areas of the pools. Below, a page in a flash memory is called a "flash page". A block is an erasure unit. Due to the characteristics of the flash memory, new data cannot be overwritten to a flash page on which old data (valid data) has been written. Consequently, if a storage device having a flash memory (a flash device) 150 overwrites new data to the same address as an address where old data is stored, then the new data (valid data) is written to an empty flash page and the old data is managed as invalid data. The flash device 150 can only erase data in block units. Therefore, when old data (invalid data) in a block is erased, the flash device 150 moves the data (valid data) of the page in use in the block, to an empty page in another block, and then erases all of the data in the block that is the movement source.

Furthermore, due to the characteristics of a flash memory, there is a limit on the number of rewrites thereto (the number of write operations or the number of erasure operations). It is not possible to write further data to a flash memory which has reached the limit of the number of rewrites (in other words, the flash memory reaches its useful life).

Consequently, if the number of rewrites in one parity group 430 is large compared to another parity group 430, among the parity groups 430 which are constituted by flash memories, then the one parity group 430 will reach its useful life in a short time. Here, the storage controller 140 executes a balancing process so as to avoid imbalance in the number of rewrites between the parity groups 430, thereby evening out the useful life between the parity groups 430. One example of a balancing process is described below. In the present description, the "balancing process" means a process for moving data between pages, and in particular, a process for moving data between pages in order to satisfy a designated avoidance requirement. As described below, the designated avoidance requirement may be write balancing (life avoidance requirement), I/O load balancing (bottleneck avoidance requirement), consumption balancing (consumption avoidance requirements), or the like. The avoidance requirement for evening out the useful life between parity groups 430 corresponds to write balancing.

The storage controller 140 counts and manages the number of write operations (called the "write value" below) to each of the parity groups #1 and #2. The write value may be a cumulative count of the number of write operations in a set time period, or may be a value designated on the basis of one or more write frequencies in a set time period (the number of write operations per unit time) (for example, the maximum, minimum or average value of the write frequency).

Here, it is supposed that the write value relating to the parity group #1 is large and the write value relating to the parity group #2 is small. In this case, the storage controller 140 executes a balancing process including (1) and (2) below, for example:

(1) data is moved from the page in use 440a based on the parity group #1, which has a large write value, to an unallocated page 441a based on parity group #2, which has a small write value (S11);

(2) the allocation of the page relating to the virtual area 411a is changed from the page 440a to the page 441a (S12). The page in use 440a should be a page conforming to prescribed conditions, and if there is a plurality of such pages in a group of pages based on the parity group #1, then (1) and (2) above may be carried out for each of this plurality of pages.

Since a large number of rewrites generally occurs in a parity group 430 having a large write value, then by this processing, it is possible to even out the number of rewrites between the parity groups 430. Consequently, evening out the number of rewrites between parity groups 430 may be regarded as evening out the write value between parity groups 430.

The storage controller 140 counts and manages the write values relating to each of the pages, and in (1) described above, may preferentially set pages having a write value greater than the first threshold value as a movement target. Therefore, the number of pages to be moved can be reduced. The first threshold value may be a fixed value, or a variable value (for example, a value specified on the basis of the write value statistics of a plurality of pages based on parity group #1).

Furthermore, with the abovementioned processing alone, the data is unbalanced towards parity group #2, and there is a risk that the usable storage capacity of the parity group #2 will become insufficient. Therefore, the storage controller 140 may move a number of page data specified on the basis of the number of page data (page-unit data) moved from parity group #1 to #2 by the abovementioned processing (for example, page data of equal number to the page data moved from the parity group #1 to #2), from the parity group #2 which has a small write value to the parity group #1 which has a large write value. In the example in FIG. 3, the data in the page having a small write value is the page 440b based on parity group #2, and the movement destination of the data in this page 440b is the unallocated page 441b based on parity group #1 (S13). The page 441b is allocated to the virtual area 411b instead of the page 440b (S14). In this case, the storage controller 140 preferentially sets, as the movement target, pages having a write value smaller than a second threshold value. The second threshold value may be a fixed value, or a variable value (for example, a value specified on the basis of the write value statistics of a plurality of pages based on parity group #2).

The storage controller 140 may manage the "amount" of written data, for example, as the write value, instead of managing the "number of write operations" as the write value.

Figure 4:
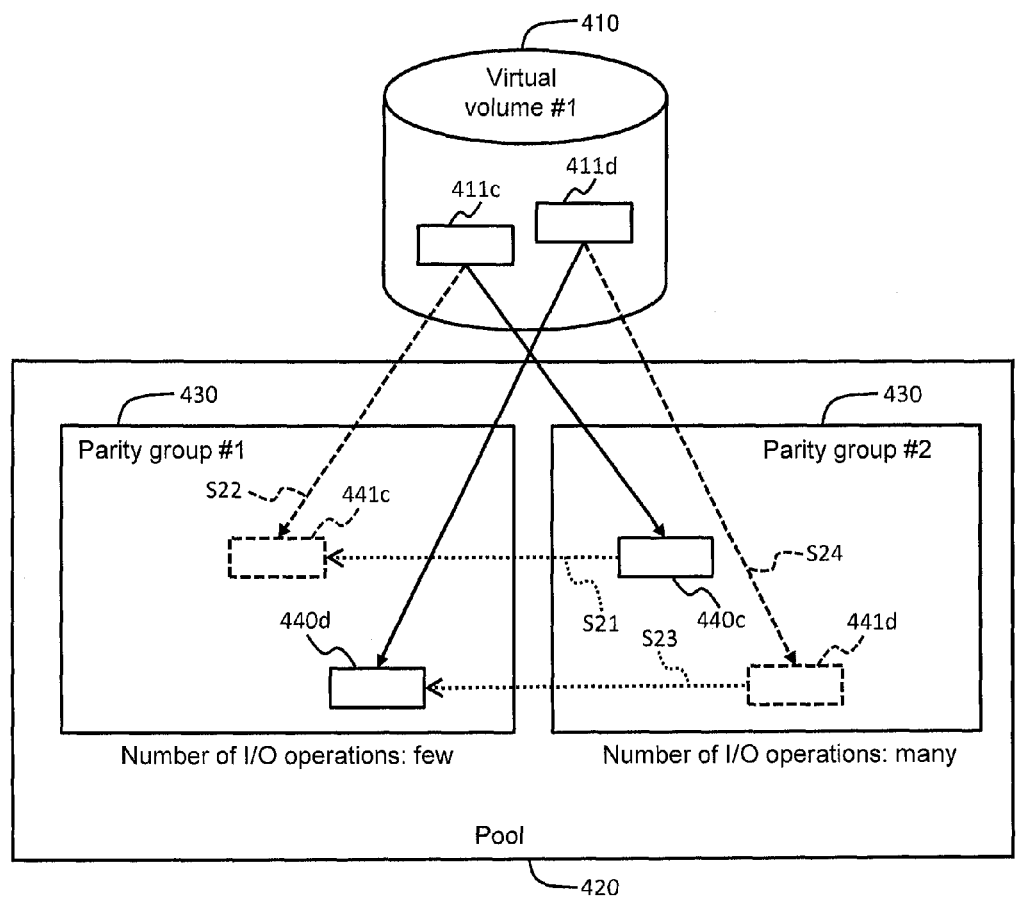
FIG. 4 is a schematic drawing for describing a balancing process which evens out the I/O load between parity groups.

FIG. 4 is a schematic drawing for describing a balancing process which evens out the I/O load between parity groups 430.

If access (I/O) operations are concentrated on a particular parity group 430, then the I/O performance of the parity group 430 creates a bottleneck, and the I/O performance of the whole pool 420 declines. Therefore, desirably, the storage controller 140 avoids concentrating access operations on a particular parity group 430. Below, one example of a balancing process for evening out the I/O load between parity groups 430 (a balancing process for I/O load balancing) will be described.

The storage controller 140 counts and manages the number of I/O operations per unit time (called the "I/O value" below) to each of the parity groups #1 and #2. The I/O value includes the number of read and write operations per unit time. Here, it is supposed that the I/O value relating to the parity group #1 is small and the I/O value relating to the parity group #2 is large. In this case, the storage controller 140 executes a balancing process including (1) and (2) below, for example:

(1) data stored in a page in use 440c based on the parity group #2, which has a large I/O value, is moved to an unallocated page 441c based on the parity group 430 #1, which has a small I/O value (S21); and (2) the allocation of the page relating to the virtual area 411a is changed from the page 440e to the page 440a (S22). By this process, it is possible to even out the I/O load between the parity groups 430. The page in use 440c should be a page conforming to prescribed conditions, and if there is a plurality of such pages in a group of pages based on the parity group #1, then (1) and (2) above may be carried out in respect of each one of this plurality of pages.

The storage controller 140 counts and manages the I/O values relating to each of the pages, and in (1) described above, may preferentially set pages having an I/O value greater than a third threshold value as a movement target. Therefore, the number of pages to be moved can be reduced. The third threshold value may be a fixed value, or a variable value (for example, a value specified on the basis of the I/O value statistics of a plurality of pages based on parity group #2).

Furthermore, with the abovementioned processing alone, the data is unbalanced towards parity group #1, and there is a risk that the usable storage capacity of the parity group #2 will become insufficient. Therefore, the storage controller 140 may move a number of page data specified on the basis of the number of page data moved from parity group #2 to #1 by the abovementioned process (for example, page data of equal number to the page data moved from the parity group #2 to #1), from the parity group #1 which has a small I/O value to the parity group #2 which has a large I/O value. In the example in FIG. 4, a page having a large I/O value is page 440d based on parity group #1, and the movement destination of the data in this page 440d is the unallocated page 441d based on parity group #2 (S23). The page 441d is allocated to the virtual area 411d instead of the page 440d (S24). In this case, the storage controller 140 preferentially sets, as the movement target, pages having an I/O value smaller than a fourth threshold value. The fourth threshold value may be a fixed value, or a variable value (for example, a value specified on the basis of the I/O value statistics of a plurality of pages based on parity group #1).

The storage controller 140 may manage the "amount" of I/O data, for example, as the I/O value, instead of managing the "number of I/O operations" as the I/O value.

A parity group 430 having a large write value does not necessarily have a large I/O value. This is because, for example, a parity group 430 having a particularly large number of read operations also has a large I/O value. Therefore, as shown in FIG. 3 and FIG. 4 described above, evening out the write values and evening out the I/O load between parity groups 430 are not always mutually compatible.

Therefore, below, the storage controller 140 which suitably achieves a plurality of different avoidance requirements of this kind (for instance, write balancing and I/O load balancing), in mutually compatible fashion, will be described.

Figure 5:
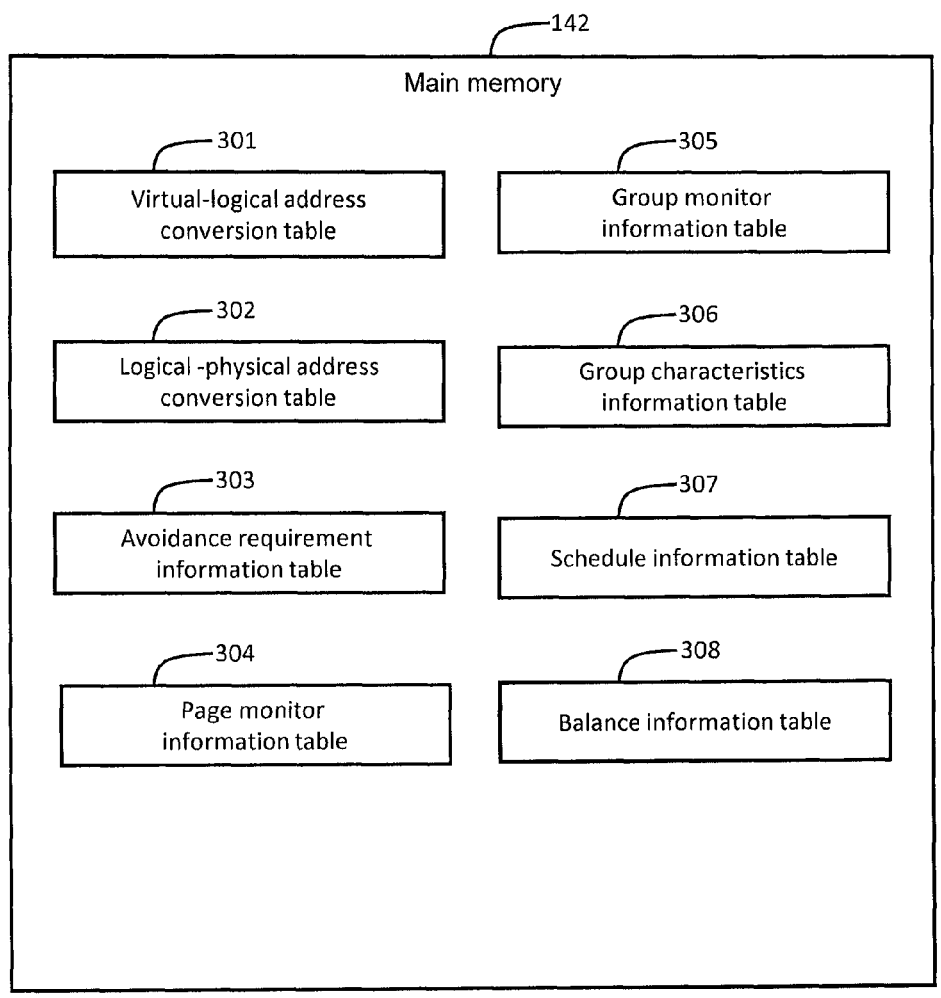
FIG. 5 is a block diagram showing information which is managed by a storage controller.

FIG. 5 is a block diagram showing information which is managed by the storage controller 140.

The storage controller 140 manages a virtual-logical address conversion table 301, a logical-physical address conversion table 302, an avoidance requirement information table 303, a page monitor information table 304, a group monitor information table 305, a group characteristics information table 306, a schedule information table 307, and a balance information table 308. This information may be held, for example, in the main memory 142, or may be held in a prescribed storage device. Below, the respective types of information are described with reference to the drawings.

FIG. 6 shows an example of the configuration of a virtual-logical address conversion table 301.

The virtual-logical address conversion table 301 manages the correspondences between a virtual address in a virtual volume 410 and a page and logical address in a parity group 430 included in a pool 420. The virtual-logical address conversion table 301 may be devised so as to manage only pages which are not allocated to a virtual address.

The virtual-logical address conversion table 301 manages one or more entry of virtual address conversion information 500 as a record 500. The virtual-logical address conversion table 301 may manage one record 500 in association with one page. The items of the virtual address conversion information 500 are: a page number 501, a virtual volume number 502, a virtual address 503, a pool number 504, a group number 505, and a logical address 506.

An identification number of a page is stored in the page number 501.

An identification number of a virtual volume 410 is stored in the virtual volume number 502. The identification number may be a LUN (Logical Unit Number) of the virtual volume number 502, the LUN being recognized by the host 100, or may be a number that is not recognized by the host 100 but is recognized by the storage controller 140.

A start address of a virtual area 411 in the virtual volume 410 is stored in the virtual address 503.

An identification number of a pool 420 is stored in the pool number 504.

An identification number of a parity group 430 is stored in the group number 505.

A start address of a page 440 in a parity group 430 is stored in the logical address 506.

For example, the table 301 shows that the page 440 corresponding to a record 500 having a page number 501 of "1" has been allocated to a virtual area 411 having a start address of "0x0000" in the virtual volume 410 having the virtual volume number 502 of "1". Moreover, the table 301 shows that that page 440 corresponds to a storage area having a start address of "0x0040" in a parity group 430 having a group number 505 of "3" which is included in a pool 420 having a pool number 504 of "1".

FIG. 7 shows an example of the configuration of a logical-physical address conversion table 302.

The logical-physical address conversion table 302 manages the correspondences between a logical address in a parity group 430 and a physical address in a storage device. The logical-physical address conversion table 302 manages one or more entry of logical address conversion information 600 as a record 600. The items in the logical address conversion information 600 are: a group number 601, a RAID type 602, and a physical drive number 603. The group number 610 is the same as the group number 505 described previously.

The type of the RAID (RAID level) constituted by the parity group 430 is stored in the RAID type 602.

The respective identification numbers of the one or more physical drives which constitute the parity group 430 are stored in the physical drive number 603.

For example, the record 600 having a group number 610 of "1" indicates that the RAID type 602 of the parity group 430 is "RAID 5". Moreover, this record 600 indicates that the parity group 430 is constituted by four physical drives which have physical drive numbers 603 of "1000", "1001", "1002" and "1003".

A logical address space and a physical address space having a correspondence to the logical address space (namely, an address space indicating a physical drive area) are formed inside the parity group 430, on the basis of the RAID type and the configuration of the physical drives. Consequently, when a group number and a logical address are specified, the physical address area corresponding to that logical address is identified via the logical-physical address conversion table 302.

FIG. 8 shows an example of the configuration of an avoidance requirement information table 303.

The avoidance requirement information table 303 manages one or more entry of avoidance requirement information 900 as a record 900. An execution status of the balancing process for satisfying the avoidance requirement may be stored in the avoidance requirement information 900. The items of the avoidance requirement information 900 are: an avoidance requirement name 901, a priority order 902, an execution status 903, and a completion time 904.

A name of an avoidance requirement is stored in the avoidance requirement name 901. For instance, "write balancing", "I/O load balancing" or "consumption balancing", etc. is stored as the avoidance requirement name 901. As mentioned previously, write balancing is an avoidance requirement which involves evening out the write values between parity groups 430. As mentioned previously, I/O load balancing is an avoidance requirement which involves evening out the I/O load between parity groups 430. Consumption balancing is an avoidance requirement which involves evening out data consumption between parity groups 430.

A priority order of the balancing process for satisfying the avoidance requirement is stored in the priority order 902. For example, in the avoidance requirement information table 303 shown in FIG. 8, the priority order of the avoidance requirement for write balancing is higher than the priority order of the avoidance requirement for I/O load balancing.

An execution status of the balancing process for satisfying the avoidance requirement is stored in the execution status 903. For example, when a balancing process for satisfying an avoidance requirement has been completed, then "completed" is stored as the corresponding execution status 903. When a balancing process for satisfying an avoidance requirement has not been completed, then "not completed" is stored as the corresponding execution status 903. If a balancing process for satisfying an avoidance requirement is being executed, then "executing" is stored as the corresponding execution status 903. If the execution status 903 is "executing", then information indicating the progress of execution may also be stored additionally.

A nearest completion time of the balancing process for satisfying the avoidance requirement is stored in the completion time 904.

For example, the record 900 having an avoidance requirement name 901 of "write balancing" indicates that the priority order 902 is "1", the balancing process for satisfying the avoidance requirement in question is "completed", and the completion time was "11:21 on 12 Jan. 2013".

FIG. 9 shows an example of the configuration of a balance information table 308.

The balance information table 308 manages one or more entry of balance information 1000 as a record 1000. The balance information table 308 manages indicators of respective types relating to avoidance requirements, for each parity group 430. The various types of indicators for each parity group 430 are used in determining whether or not to carry out a balancing process between parity groups, and in calculating the amount of data moved. The items of the balance information 1000 are: a group number 1001, an upper limit indicator 1002, and a plan indicator 1003. The group number 1001 is the same as the group number 505 described previously.

An upper limit value relating to the number of input/output operations is stored in the upper limit indicator 1002, as an indicator for satisfying an avoidance requirement. The maximum write value 1011, for example, corresponds to the avoidance requirement for "write balancing". The maximum I/O value 1012, for instance, corresponds to the avoidance requirement for "I/O load balancing". The upper limit indicator 1002 may be calculated as appropriate, or may be derived in advance. A value of "NULL" may be stored as an upper limit indicator 1002 that has not been calculated.

A value relating to input/output is stored in the plan indicator 1003, as an indicator for executing a balancing process for satisfying an avoidance requirement, in a planned fashion. The plan indicator 1003 may be calculated as appropriate. A value of "NULL" may be stored as a plan indicator 1003 that has not been calculated.

In the maximum write value 1011, the maximum write value relating to the parity group 430 corresponding to the record 1000 having that maximum write value 1011 is stored. In the planned write value 1013, the expected write value relating to the parity group 430 corresponding to the record 1000 having that planned write value 1013 is stored. The expected write value is a threshold value which is compared with the write value of the parity group 430 and is used to define the timing at which a balancing process is started in order to prevent the write value of that parity group 430 from exceeding the maximum write value thereof. More specifically, provided that a balancing process is started when the write value of a parity group 430 exceeds the expected write value, then the write value of that parity group 430 can be expected not to exceed the maximum write value.

The maximum write value 1011 and the planned write value 1013 may be the sum total of write values in a certain time period, or may be the cumulative total of write values since a certain time point.

In the maximum I/O value 1012, the maximum I/O value relating to the parity group 430 corresponding to the record 1000 having that maximum I/O value 1012 is stored. In the planned I/O value 1014, the expected I/O value relating to the parity group 430 corresponding to the record 1000 having that planned I/O value 1013 is stored. The expected I/O value is a threshold value which is compared with the I/O value of the parity group 430 and is used to define the timing at which a balancing process is started in order to prevent the I/O value of that parity group 430 from exceeding the maximum I/O value thereof. More specifically, provided that a balancing process is started when the I/O value of a parity group 430 exceeds the expected I/O value, then the I/O value of that parity group 430 can be expected not to exceed the maximum I/O value.

The maximum I/O value 1012 and the planned I/O value 1014 may be the sum total of I/O values in a certain time period, or may be the cumulative total of I/O values since a certain time point.

For example, the record 1000 having a group number 1001 of "1" indicates that the maximum write value 1011 of the parity group 430 having a group number of "1" is "500", and that the planned write value 1013 thereof is "200". Furthermore, this record 1000 indicates that the maximum I/O value 1012 of the parity group 430 having a group number of "1" is "1000", that the planned I/O value 1014 thereof is "1000".

FIG. 10 shows an example of the configuration of a page monitor information table 304.

The page monitor information table 304 manages one or more entry of page monitor information 1300 as a record 1300. The page monitor information table 1300 may be configured to manage only pages that have been allocated. The page monitor information table 304 may be updated periodically or at an arbitrary timing. The items of the page monitor information 1300 are: a page number 1301, a page write value 1302, a page I/O value 1303 and a page consumption 1304.

The page number 1301 is the same as the page number 501 described previously.

The write value of the page corresponding to the page number 1301 is stored in the page write value 1302. The page write value 1302 may be the number of write operations per unit time (operations per second) corresponding to that page, or may be the total number of write operations since a certain time point.

The I/O value of the page corresponding to the page number 1301 is stored in the page I/O value 1303. The page I/O value 1303 may be the number of I/O operations per unit time (I/O operations per second) corresponding to that page, or the I/O data volume per unit time (kB per second), or the total number of I/O operations since a certain time point, or the I/O data volume (kB) since a certain time point.

The consumption of the page corresponding to the page number 1301 (in other words, the total volume of valid data stored in that page (kB)) is stored in the page consumption 1304.

For instance, the record 1300 having a page number 1301 of "1" indicates that the page write value of the page having a page number 1301 of "1" is "1000", that the page I/O value 1303 is "1500" and that the page consumption 1304 is "200".

FIG. 11 shows an example of the configuration of a group monitor information table 305.

The group monitor information table 305 manages one or more entry of group monitor information 1400 as a record 1400. The group monitor information table 305 may be created respectively for each pool 420. The group monitor information table 305 may be updated in accordance with the updating of the page monitor information table 304. The items of the group monitor information 1400 are: a group number 1401, a group write value 1402, a group I/O value 1403 and a group consumption 1404.

The group number 1401 is the same as the group number 505 described previously.

The write value of the parity group 430 corresponding to the group number 1401 is stored in the group write value 1402. The group write value 1402 is, for example, the sum total of the page write values 1302 of allocated pages belonging to the parity group 430.

The I/O value of the parity group 430 corresponding to the group number 1401 is stored in the group I/O value 1403. The group I/O value 1403 is, for example, the sum total of the page I/O values 1303 of allocated pages belonging to the parity group 430.

The data consumption of the parity group 430 corresponding to the group number 1401 (in other words, the total volume of valid data stored in the parity group 430 in question) is stored in the group consumption 1404. The group consumption 1404 is, for example, the sum total of the page consumption 1304 of allocated pages belonging to the parity group 430.

FIG. 12 shows an example of the configuration of a group characteristics information table 306a for write balancing (called "write characteristics table 306a" below). In the write characteristics table 306a, the allocated pages included in a parity group 430 are divided on the basis of the page write value 1302. The write characteristics table 306a is generated for each parity group 430, for example. The write characteristics table 306a may be calculated using information stored in the page monitor information table 304. The write characteristics table 306a may be updated in accordance with the updating of the page monitor information table 304.

The write characteristics table 306a manages a plurality of entries of division information 1500, respectively, as records 1500. The items of the division information 1500 are: a page write value division 1501, the number of pages 1502, and a total page write value 1503.

A value indicating the division of the page write value 1302 is stored in the page write value division 1501.

The number of pages having a page write value 1302 included in the page write value division 1501 is stored in the number of pages 1502.

A total of the page write values 1302 of the pages having a page write value 1302 included in the page write value division 1501 (in other words, the pages corresponding to the number of pages 1502) is stored in the total page write value 1503.

For example, the record 1500 corresponding to a page write value division 1501 of "0 to 100" indicates that the number of pages (1502) having a page write value 1302 included in the page write value division 1501 of "0 to 100" is "100 pages", and that the sum total of the page write values (1503) of the pages corresponding to this number of pages 1502 is "5000".

FIG. 13 shows an example of the configuration of a group characteristics information table 306b for I/O load balancing (called an "I/O load characteristics table 306b" below). In the I/O load characteristics table 306b, the allocated pages included in a parity group 430 are divided on the basis of the page I/O value 1303. The I/O load characteristics table 306b is generated for each parity group 430, for example. The I/O load characteristics table 306b may be calculated using information stored in the page monitor information table 304. The I/O load characteristics table 306b may be updated in accordance with the updating of the page monitor information table 304.

The I/O load characteristics table 306b manages a plurality of entries of division information 2000, respectively, as records 2000. The items of the division information 2000 are: a page I/O value division 2001, the number of pages 2002, and a total page I/O value 2003. Moreover, the division information 2000 may include a total page write value 2004. In other words, the division information 2000 may have an item relating to other avoidance requirements having a higher priority order than the avoidance requirement relating to this table. This item indicates, for example, the extent to which the balancing process for satisfying the avoidance requirement relating to this table affects other avoidance requirements having a higher priority order than the avoidance requirement relating to this table.

A value indicating the division of the page I/O value 1303 is stored in the page I/O value division 2001.

The number of pages having a page I/O value 1303 included in the page I/O value division 2001 is stored in the number of pages 2002.

A total of the page I/O values of the pages having a page I/O value 1303 included in the page I/O value division 2001 (in other words, the pages corresponding to the number of pages 2002) is stored in the total page I/O value 2003.

A total of the page write values 1302 of the pages having a page I/O value 1303 included in the page I/O value division 2001 (in other words, the pages corresponding to the number of pages 2002) is stored in the total page write value 2004.

For example, the record 2000 corresponding to the page I/O value division 2001 of "0 to 100" indicates that the number of pages (2002) having a page I/O value 1303 included in the page I/O value division 2001 of "0 to 100" is "100 pages", that the total page I/O value 2003 of the pages corresponding to this number of pages 2002 is "5400", and that the total page write value 2004 of the pages corresponding to this number of pages 2002 is "2500".

FIG. 14 shows an example of the configuration of a schedule information table 307.

The schedule information table 307 manages information relating to the movement of pages between the parity groups 430. The schedule information table 307 may be created for each balancing process for satisfying an avoidance requirement. The schedule information table 307 manages one or more entry of schedule information 1600 as a record 1600.

The items of the schedule information 1600 are: a movement source group number 1601, a movement type 1602, a movement threshold value 1603, a movement destination group number 1604, the number of pages scheduled for movement 1605, and the number of moved pages 1606.

The number of the parity group 430 which is the movement source of the page is stored in the movement source group number 1601.

Information indicating whether the schedule information 1600 decreases (outflow), or increases (inflow), the indicators relating to the avoidance requirement of the parity group 430 corresponding to the movement source group number 1601 (for example, the group write value 1402 or the group I/O value 1403) is stored in the movement type 1602. For example, if the schedule information 1600 decreases the group write value 1402 of the parity group 430 corresponding to the movement source group number 1601, then "outflow" is stored in the movement type 1620. If, for example, the schedule information 1600 increases the group write value 1402 of the parity group 430 corresponding to the movement source group number 1601, then "inflow" is stored in the movement type 1602.

A threshold value relating to page movement is stored in the movement threshold value 1603. If the movement type 1602 is "outflow", then a minimum movement threshold value is stored in the movement threshold value 1603. If the movement type 1602 is "inflow", then a maximum movement threshold value is stored in the movement threshold value 1603. For example, if the avoidance requirement is write balancing (life avoidance requirement) and the movement type 1602 is "outflow", then a page having a page write value 1302 greater than the minimum movement threshold value 1603 is set as the movement target. Furthermore, if the movement type 1602 is "inflow", then a page having a page write value 1032 smaller than the maximum movement threshold value 1603 is set as the movement target. Therefore, as described above, it is possible to reduce the number of pages that are moved.

The number of the parity group 430 which is the movement destination of the page is stored in the movement destination group number 1604.

The number of pages scheduled for movement to the movement destination parity group 530 from the movement source parity group 430 is stored in the number of pages scheduled for movement 1605.

The number of pages moved to the movement destination parity group 430 from the movement source parity group 403 is stored in the number of moved pages 1606.

For example, the record 1600 having a movement source group number 1601 of "1" indicates that the number of pages scheduled for movement from the parity group 430 corresponding to a movement source group number 1601 of "1" to the parity group 430 corresponding to a movement destination group number 1604 of "2" is "100", and that the number of pages scheduled for movement to the parity group 430 corresponding to the movement destination group number 1604 of "3" is "70". This record 1600 also indicates that pages having a page write value 1302 larger than the "100" value of the movement threshold value 1603 are the movement target. Moreover, the record 1600 also indicates that the number of pages that have been moved to a parity group 403 corresponding to the movement destination group number 1604 of "2" is "100" (in other words, all of the pages have been moved), and the number of pages that have been moved to a parity group 403 corresponding to the movement destination group number 1604 of "3" is "50". The foregoing applies similarly to a case where the avoidance requirement is group I/O load balancing (bottleneck avoidance requirement).

Figure 15:
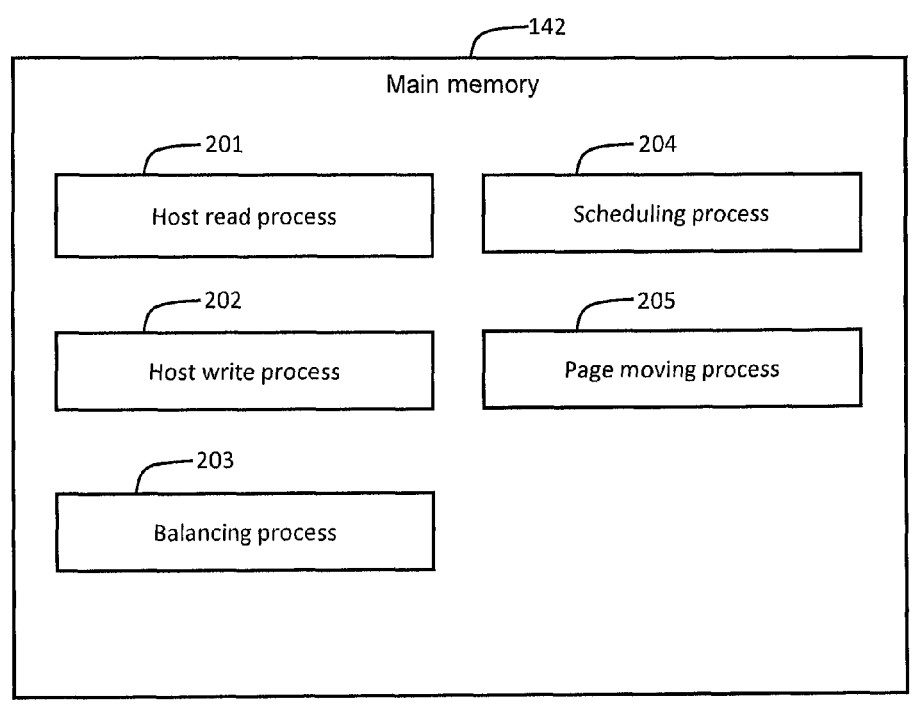
FIG. 15 is a block diagram showing a process which is executed by a storage controller.

FIG. 15 is a block diagram showing processing which is executed by the storage controller 140.

The storage controller 140 can execute, for example, a host read process 201, a host write process 202, a balancing process 203, a scheduling process 204 and a page moving process 205. For example, the processor 141 provided in the storage controller 140 is able to read programs corresponding to these processes, and to execute these programs.

The host read process 201 reads data corresponding to a read command received from the host 100, from the cache memory 143 or the parity group 430, and sends this data back to the host 100. For example, a read command includes the virtual volume number 502 of a virtual volume 410, a virtual address 503, and a data length to be read.

The host write process 202 temporarily stores data corresponding to the write command received from the host 100, in the cache memory 143, and then sends back a completion response. The data stored temporarily in the cache memory 143 is subsequently (non-synchronously) written to the parity group 430. For example, a write command includes a number of a virtual volume 410, a virtual address 503, a data length to be written, and the actual write data.

As mentioned above, the storage controller 140 manages a plurality of parity groups 430 (storage device groups) composed by a plurality of storage devices 150, and a plurality of pages (storage areas) included in those parity groups 430. Furthermore, the storage controller 140 executes a balancing process for moving data between pages based on different parity groups 430. The storage controller 140 then determines whether or not to execute an I/O load balancing process (first balancing process) in order to satisfy a bottleneck avoidance requirement (first avoidance requirement), among a plurality of avoidance requirements for avoiding the occurrence of a problem in any one storage device 150 only, of the plurality of storage devices 150, on the basis of a life avoidance requirement (second avoidance requirement) which has been satisfied by the write balancing process executed prior to the I/O load balancing process for satisfying the bottleneck avoidance requirement, and if the result of this determination is affirmative, then the storage controller 140 executes an I/O load balancing process (first balancing process).

The storage controller 140 may execute the balancing process 303 in such a manner that two or more avoidance requirements are satisfied between parity groups 430 included in the pool 420. The storage controller 140 may execute the balancing process 303 in such a manner that an avoidance requirement having a higher priority order is satisfied preferentially. Below, the respective processes are described with reference to the drawings.

Figure 16:
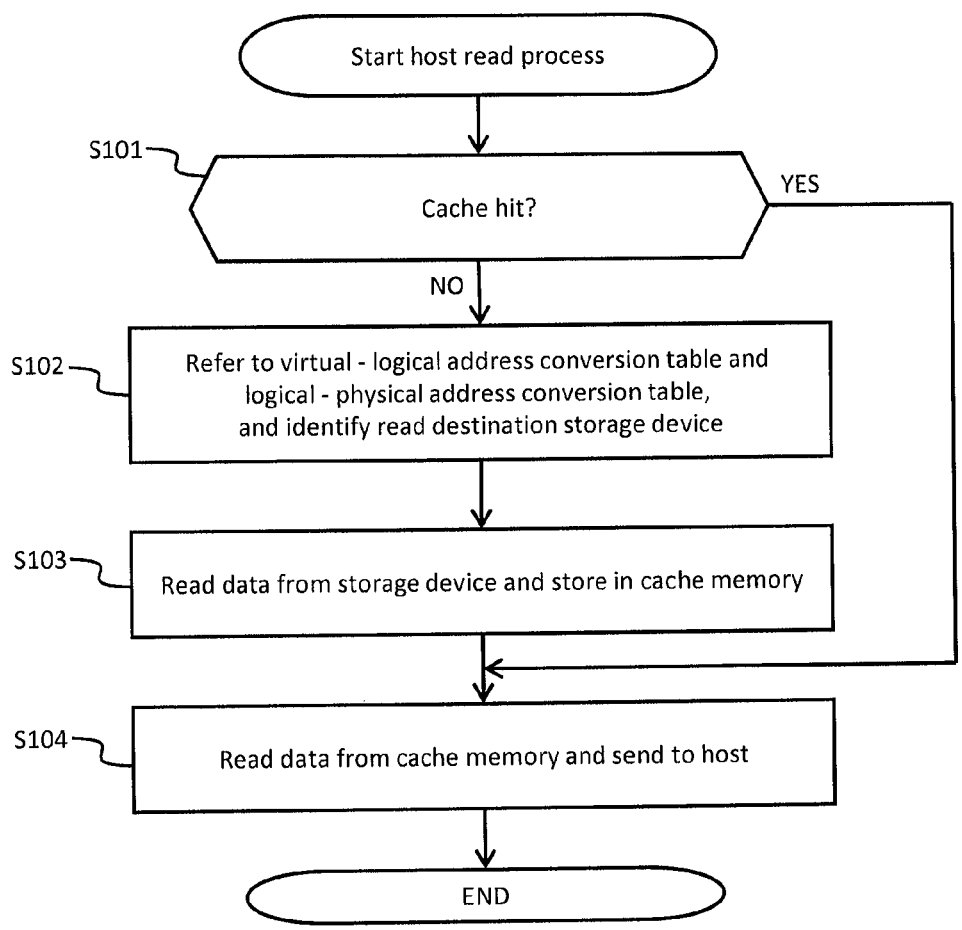
FIG. 16 is a flowchart showing one example of a host read process.

FIG. 16 is a flowchart showing one example of a host read process 201.

Below, one example of a host read process 201 executed by the storage controller 140 is described.

Upon receiving a read command from the host 100, the storage controller 140 determines whether or not data corresponding to the virtual address 503 is stored in the cache memory 143 (S101).

If the data corresponding to the virtual address 503 is stored in the cache memory 143 (S101: YES), then the storage controller 140 sends back the data stored in the cache memory 143, to the host 100 (S104), and then terminates this processing (END).

If data corresponding to the virtual address 503 is not stored in the cache memory 143 (S101: NO), then the storage controller 140 refers to the virtual-logical address conversion table 301 and the logical-physical address conversion table 302, and identifies the storage device 150 and the storage area of the read destination (S102). Thereupon, the storage controller 140 reads data from the identified storage device 150 and storage area, and stores this data temporarily in the cache memory 143 (S103). Next, the storage controller 140 reads this data from the cache memory 143, sends the data to the host 100 (S104), and then terminates the process (END).

Figure 17:
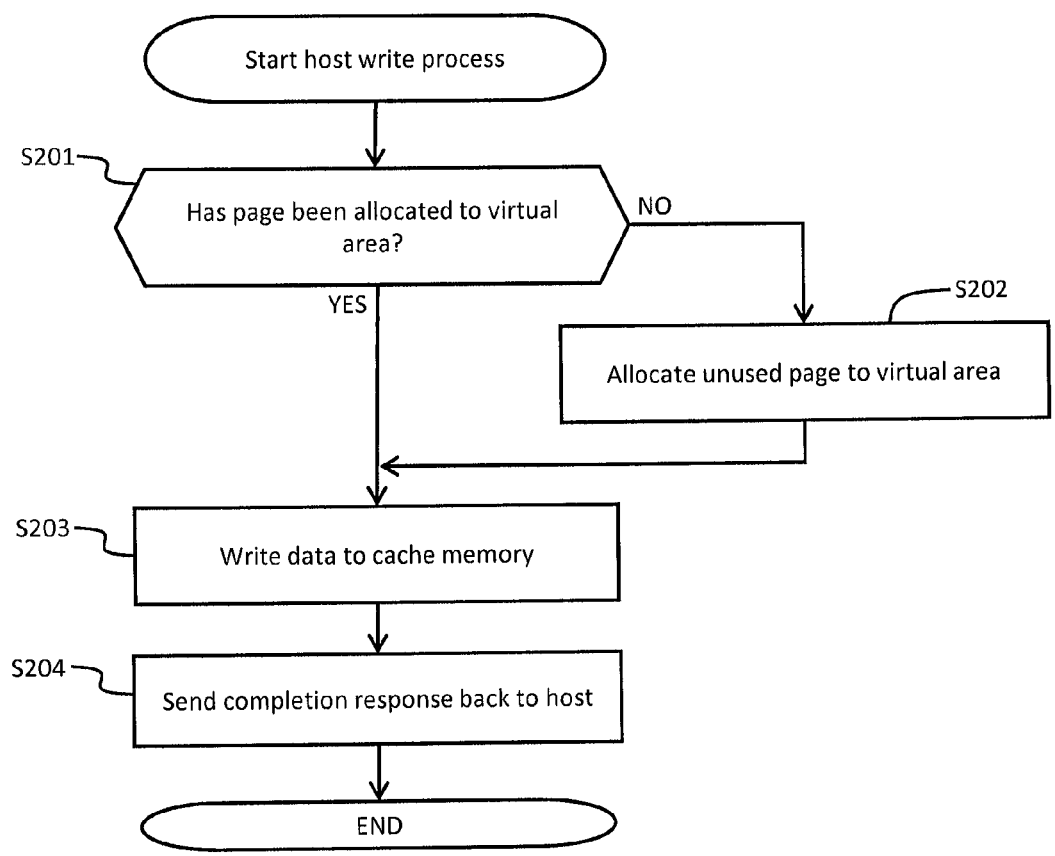
FIG. 17 is a flowchart showing one example of a host write process.

FIG. 17 is a flowchart showing one example of a host write process 202.

Below, one example of a host write process 202 executed by the storage controller 140 is described.

Upon receiving a write command from the host 100, the storage controller 140 refers to the number and virtual address 503, etc., of the virtual volume 410 included in the write command, and the virtual-logical address conversion table 301, and determines whether or not a page 440 has been allocated to the virtual area 411 corresponding to the virtual address 503 (S201). For example, the storage controller 140 may determine that a page 440 has been allocated, if a record 500 containing the virtual address 503 in question is already registered in the virtual-logical address conversion table 301, and may determine that a page 440 has not been allocated, if a record 500 containing the virtual address 503 in question has not been registered.

If a page 440 has not been allocated to the virtual area 411 (S201: NO), then the storage controller 140 allocates an unused page 440 to the storage area 411 in question, updates the virtual-logical address conversion table 301 (S202), and advances to step S203.

If a page 440 has been allocated to this virtual area 411 (S201: YES), then the storage controller 140 advances directly to step S203.

In step S203, the storage controller 140 temporarily stores write data in the cache memory 143 (S203).

The storage controller 140 sends back a write completion response to the host 100 (S204). As mentioned above, the write data stored temporarily in the cache memory 143 is subsequently (non-synchronously) stored in the allocated page 440.

Figure 18:
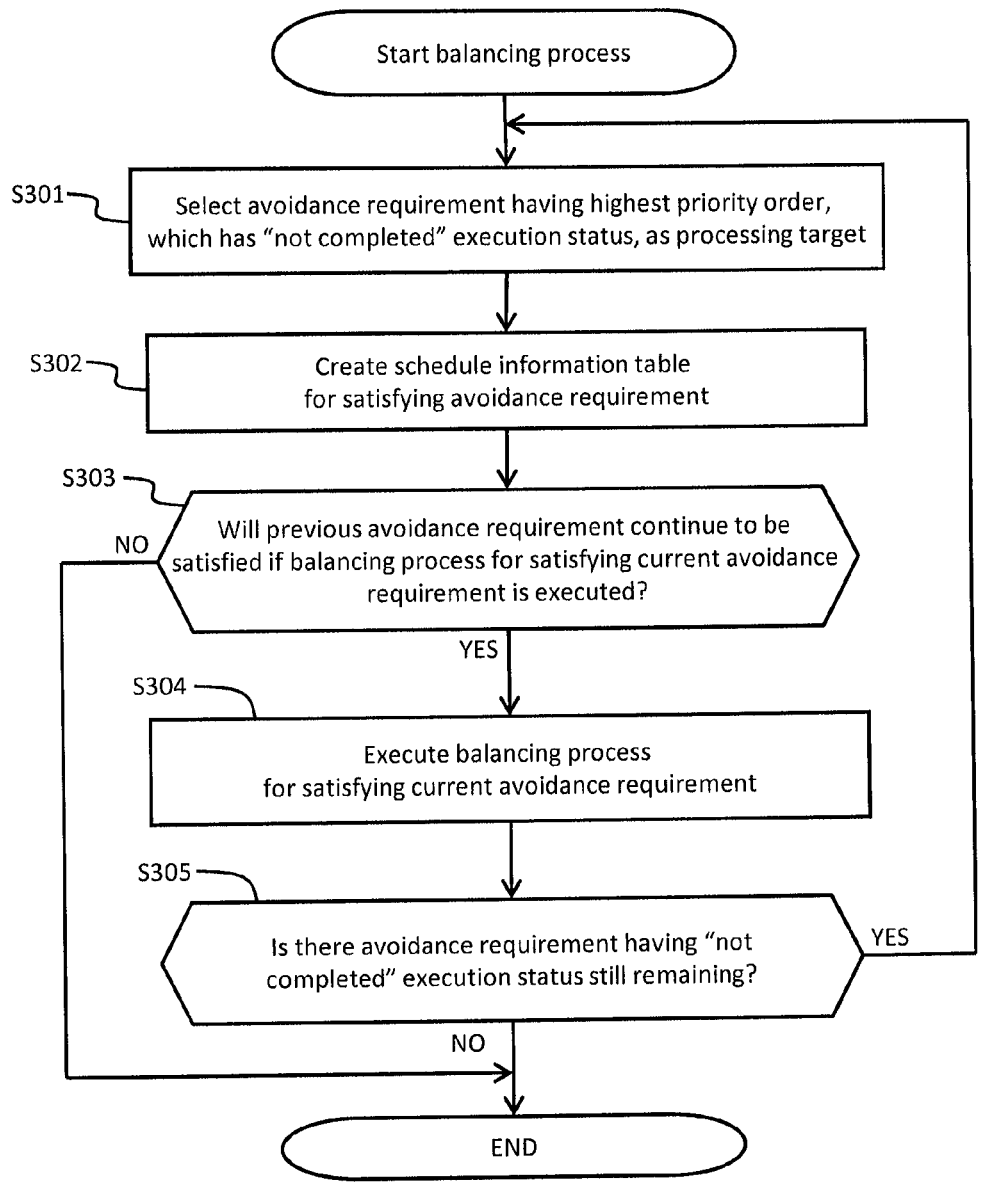
FIG. 18 is a flowchart showing one example of a balancing process.

FIG. 18 is a flowchart showing one example of a balancing process 303.

Below, one example of a balancing process 303 executed by the storage controller 140 is described.

The storage controller 140 selects the avoidance requirement having the highest priority order, for which the execution status 903 is "not completed", as the current avoidance requirement (S301).

The storage controller 140 creates a schedule information table 307 for satisfying the current avoidance requirement (S302). The schedule information table 307 is created by a scheduling process 204. The details of this scheduling process 204 are described below.

On the basis of this schedule information table 307, the storage controller 140 determines whether or not the previous avoidance requirement would continue to be satisfied, if a balancing process 303 for satisfying the current avoidance requirement were to be carried out (S303). The details of this judgment method are described below.

If the determination in step S303 is negative (S303: NO), then the storage controller 140 terminates this process without executing a balancing process 303 in order to satisfy the current avoidance requirement (END).

If the determination in step S303 is affirmative (S303: YES), then the storage controller 140 executes a balancing process 303 in order to satisfy the current avoidance requirement, on the basis of the schedule information table 307 (S304). When execution of the balancing process 303 has been completed, the execution status 903 is updated to "completed".

The storage controller 140 determines whether or not there still remains an avoidance requirement having an execution status 903 of "not completed" (S305), and if such an avoidance requirement is remaining (S305: YES), then the procedure returns to step S301, whereas if no such avoidance requirement is remaining (S305: NO), then the process is terminated (END).

Figure 19:
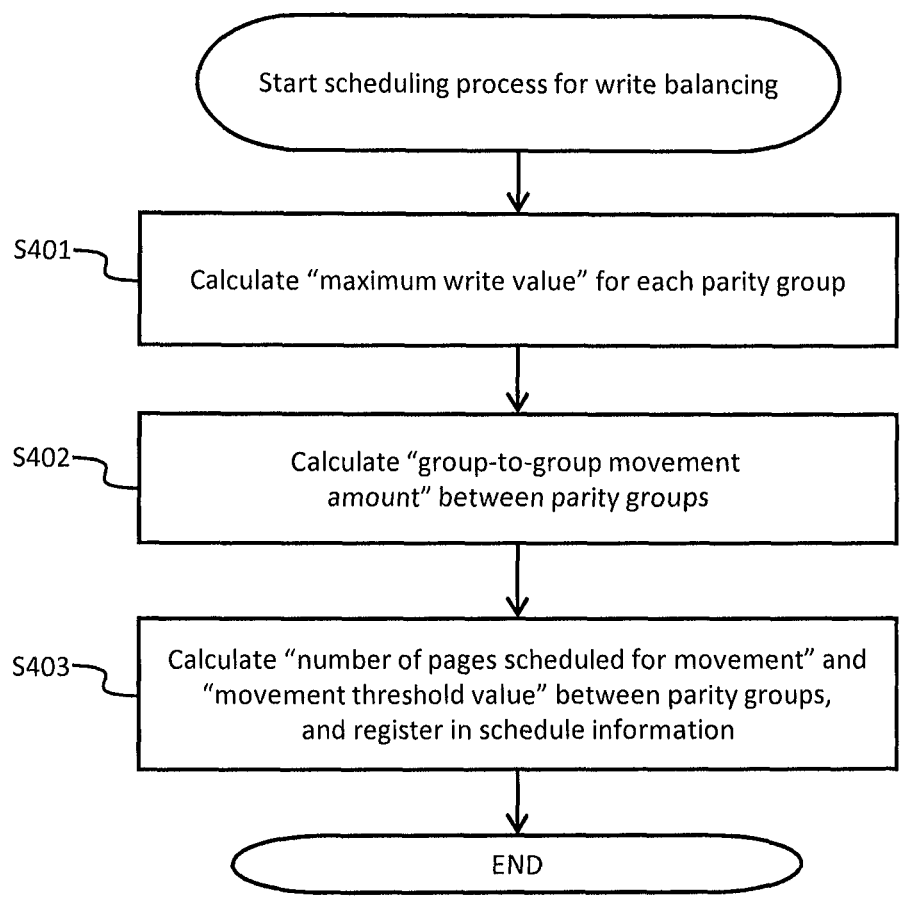
FIG. 19 is a flowchart showing one example of a scheduling process for write balancing.

FIG. 19 is a flowchart showing one example of a scheduling process 204 for write balancing.

Below, one example of a scheduling process 204 executed by the storage controller 140 is described.

The storage controller 140 creates a schedule information table 307, on the basis of indicators for satisfying the avoidance requirements. The storage controller 140 may, for example, create a schedule information table 307 for each avoidance requirement, by using the information stored in the page monitor information table 304, the group monitor information table 305, and the group characteristics information table 306.

The storage controller 104 may create a schedule information table 307 for write balancing, by using information such as the page write value 1302 and the group write value 1402, etc., in respect of the avoidance requirement for write balancing (life avoidance requirement).

The storage controller 140 may create a schedule information table 307 for I/O load balancing, by using information, such as the page I/O value 1303 and the group I/O value 1403, etc., in respect of the avoidance requirement for I/O load balancing (bottleneck avoidance requirement).

The description given below is based on one example of processing with respect to an avoidance requirement for write balancing, but a similar description applies also to the processing with respect to an avoidance requirement for I/O load balancing.

The storage controller 140 calculates the maximum write value 1011 in the balance information table 308, for each of the parity groups 430 which constitute the pool 420 (S401). The details of the method for calculating the maximum write value 1011 are described below.

Next, the storage controller 140 calculates the "group-to-group movement amount" between the parity groups 430 (S402). The details of the method for calculating the group-to-group movement amount are described below.

Next, the storage controller 140 calculates the number of pages scheduled for movement 1605 and the movement threshold value 1603, registers these values in the schedule information table 307 (S403), and terminates the process (END). The details of the method for calculating the number of pages scheduled for movement 1605 and the movement threshold value 1603 are described below.

The schedule information table 1605 relating to an avoidance requirement for write balancing is created by the processing described above.

Figure 20:
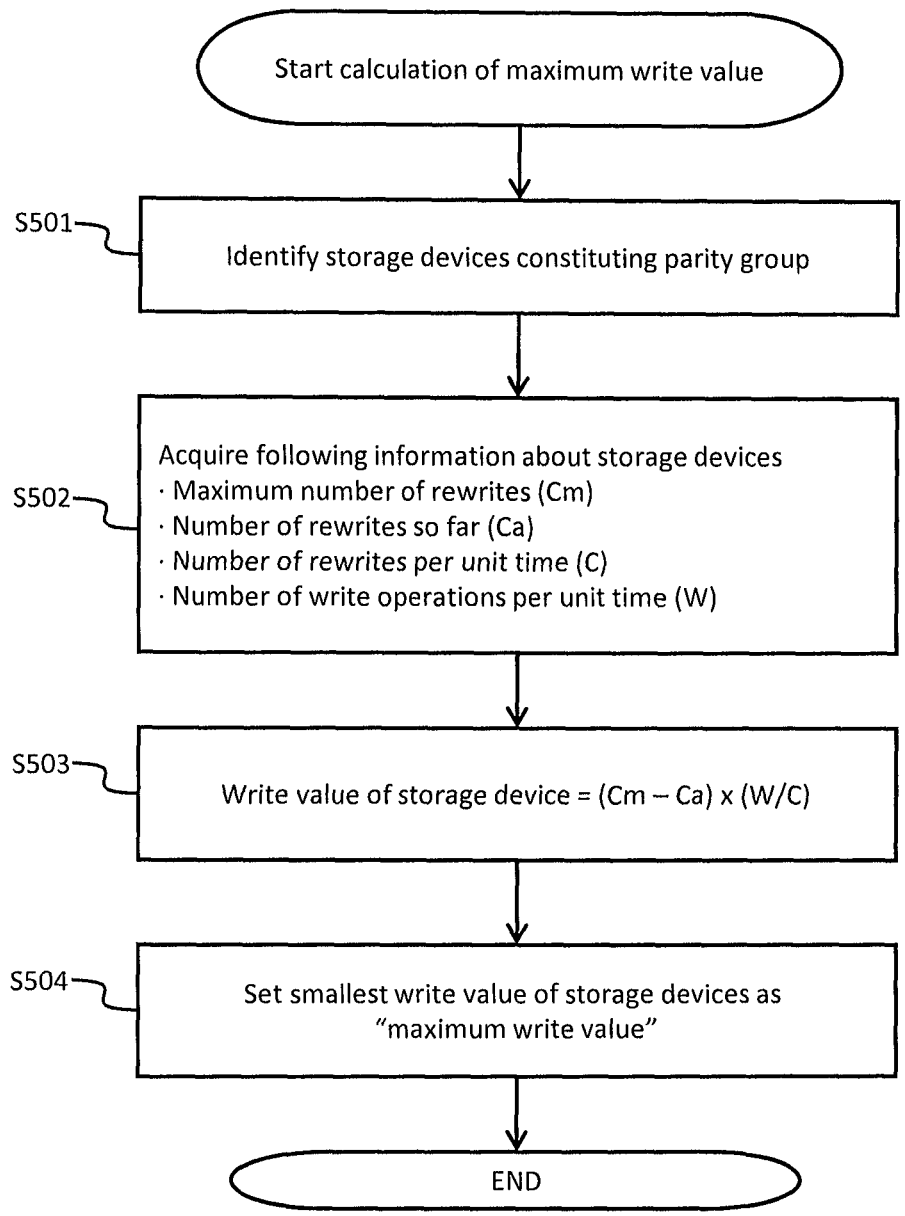
FIG. 20 is a flowchart showing one example of a method for calculating a maximum write value.

FIG. 20 is a flowchart showing one example of a method for calculating the maximum write value 1001.

The storage controller 140 identifies a plurality of storage devices 150 which constitute a parity group 430 (S501), and acquires the following information for each storage device 150 (S502).

Maximum number of rewrites (Cm)
Number of rewrites so far (Ca)
Number of rewrites per unit time (C)
Number of write operations per unit time (W)

The storage controller 140 calculates "write value of storage device=(Cm−Ca)×(W/C)" for each storage device 150 (S503).

The storage controller 140 sets the smallest value of the "write value of storage device" calculated for each of the storage devices 150, as the maximum write value 1011 of that parity group 430 (S504), and terminates this process (END).

Figure 21:
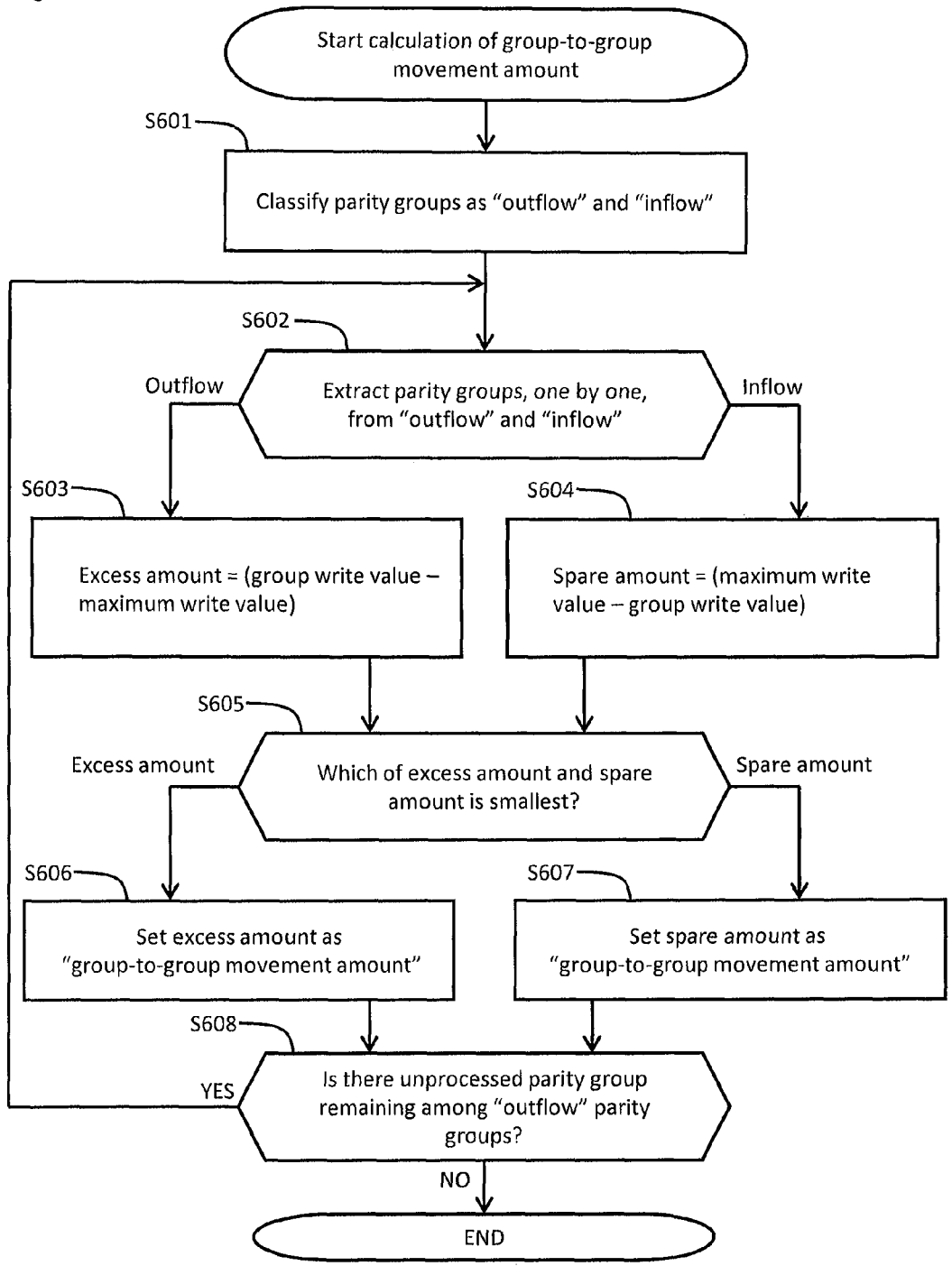
FIG. 21 is a flowchart showing one example of a method for calculating a group-to-group movement amount.

FIG. 21 is a flowchart showing one example of a method for calculating the group-to-group movement amount.

The description given below is based on one example of processing with respect to an avoidance requirement for write balancing, but a similar description applies also to the processing with respect to an avoidance requirement for I/O load balancing.

The storage controller 140 classifies the plurality of parity groups 430 which constitute the pool 420, into an "outflow" in which the group write value 1402 decreases and an "inflow" in which the group write value 1402 increases. For example, the storage controller 140 classifies a parity group 430 in which the group write value 1402 is greater than the maximum write value 1011 as "outflow" and classifies a parity group 430 in which the group write value 1402 is equal to or less than the maximum write value 1011 as "inflow" (S601).

The storage controller 140 extracts the parity groups 430, respectively, one by one, from the "outflow" and "inflow" categories (S602).

The storage controller 140 calculates "excess amount=group write value 1402−maximum write value 1011" for the parity groups 430 which have been extracted from the "outflow" category (S603).

Furthermore, the storage controller 140 calculates "spare amount=maximum write value 1011−group write value 1402" for the parity groups 430 which have been extracted from the "inflow" category (S604).

The storage controller 140 compares the "excess amount" and the "spare amount" calculated as described above, to see which is smaller (S605).

If the excess amount is less than the spare amount (S605: excess amount), then the storage controller 140 sets the "excess amount" as the "group-to-group movement amount" (S606), and then advances to step S608.

If the excess amount is equal to or greater than the spare amount (S605: spare amount), then the storage controller 140 sets the "spare amount" as the "group-to-group movement amount" (S607), and then advances to step S608.

The storage controller 140 determines whether or not there remains a parity group 430 in the "outflow" category that has not yet been processed (S608), and if there remains an unprocessed parity group 403 (S608: YES), the procedure returns to step S602, whereas if there remains no unprocessed parity group 403 (S608: NO), then the process is terminated (END).

In step S602, it is possible to alter which parity group 430 is extracted preferentially in accordance with a prescribed object. For example, if the total of the excess amounts of the group write values of the parity groups 430 belonging to the "outflow" category is greater than the total of the surplus amounts of the group write values of the parity groups 430 belonging to the "inflow" category, then the parity groups 430 belonging to the "outflow" category in step S601 cannot be reduced to zero. In a case such as this, the storage controller 140 may preferentially extract a parity group 430 having a small excess amount, from the "outflow" category, in step S602. Consequently, it is possible to minimize the number of parity groups 430 exceeding the maximum write value.

Figure 22:
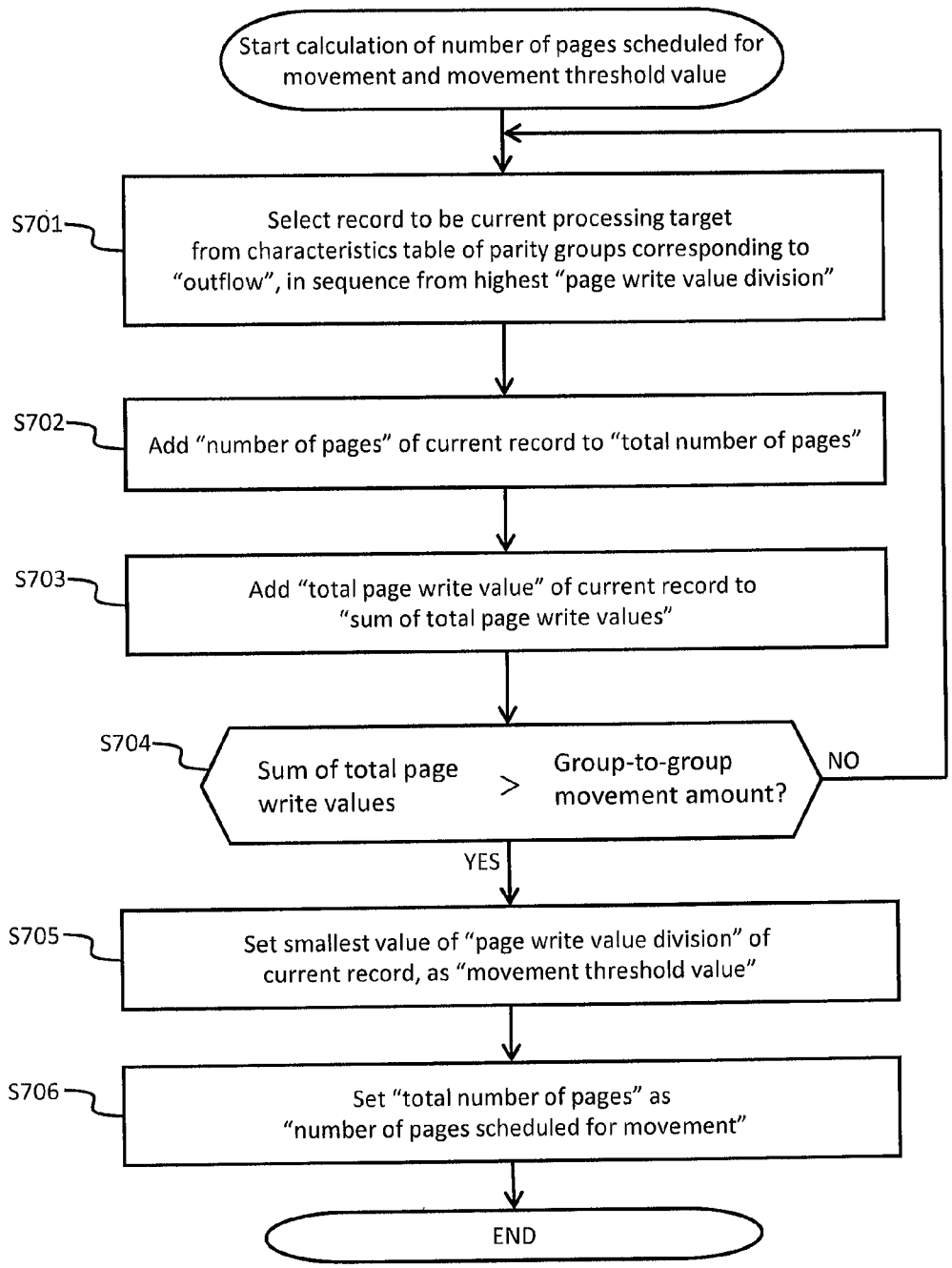
FIG. 22 is a flowchart showing one example of a method for calculating the number of pages scheduled for movement and a movement threshold value.

FIG. 22 is a flowchart showing one example of a method for calculating the number of pages scheduled for movement and the movement threshold value.

The description given below is based on one example of processing with respect to an avoidance requirement for write balancing, but a similar description applies also to the processing with respect to an avoidance requirement for I/O load balancing.

The storage controller 140 selects the record 1500 to be the current processing target from the write characteristics table 306a of the parity groups 430 corresponding to "outflow", in sequence from the highest page write value division 1501 (S701).

The storage controller 140 adds the number of pages 1502 of the current record 1500 to the "total number of pages" according to the records 1500 processed thus far (S702). The storage controller 140 adds the total page write value 1503 of the current record 1500 to the "sum of total page write values" according to the records 1503 processed thus far (S703).

The storage controller 140 determines whether or not the sum of the total page write values is greater than the group-to-group movement amount (S704).

If the sum of the total page write values is equal to or less than the group-to-group movement amount (S704: NO), then the storage controller 140 returns to step S701, and sets the next record 1500 as the processing target.

If the sum of the total page write values is greater than the group-to-group movement amount (S704: YES), then the storage controller 140 sets the smallest value of the page write value division 1501 of the current record 1500, as the movement threshold value 1603 (S705).

The storage controller 140 then sets the "total number of pages" as the number of pages scheduled for movement 1605 (S706), and terminates the process (END).

The movement threshold value 1603 and the number of pages schedule for movement 1605 which have been calculated in this way are registered in the schedule information table 307.

Figure 23:
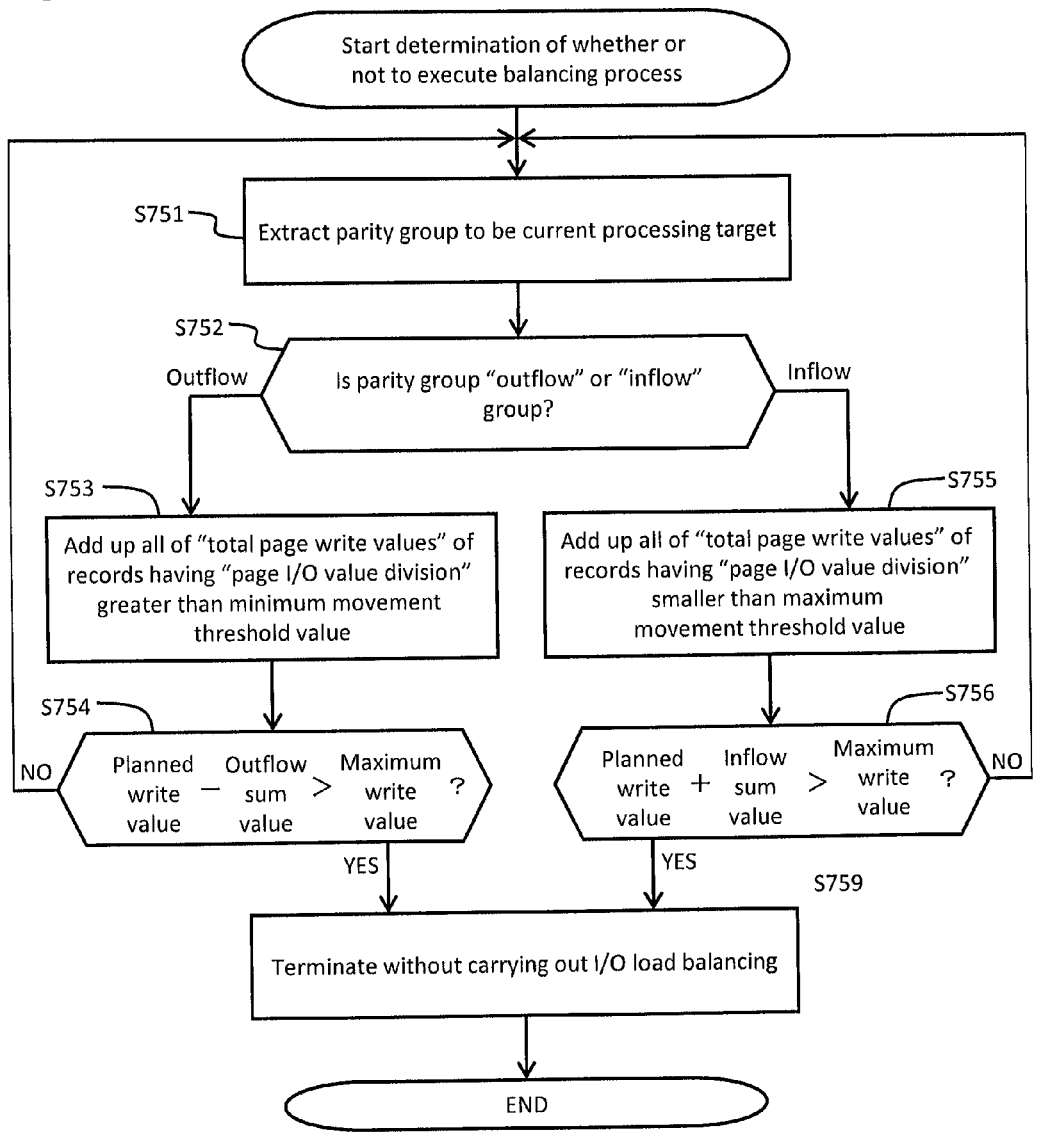
FIG. 23 shows one example of a method for determining whether or not to execute a balancing process.

FIG. 23 shows one example of a method for determining whether or not to execute a balancing process (in other words, the determining method in step S303).

Below, an example is described in which a balancing process for satisfying an avoidance requirement for write balancing is executed, and then a balancing process for satisfying an avoidance requirement for I/O load balancing is carried out.

The storage controller 140 extracts a parity group 430 to be the current processing target (S751).

The storage controller 140 determines whether the movement type 1602 of the current parity group 430 is "outflow" or "inflow" (S752).

Firstly, a case where the movement type 1602 is "outflow" (S752: outflow) will be described.

The storage controller 140 extracts records 2000 in which the value of the page I/O value division 2001 is greater than the minimum movement threshold value 1603 of the current parity group 430, from the I/O load characteristics table 306b, and sums up all of the total page write values 2004 of the extracted records 2000 (S753). This value is called the "sum outflow value".

The storage controller 140 refers to the record 1000 of the current parity group 430 in the balance information table 308, and determines whether or not "planned write value 1013−sum outflow value>maximum write value 1011" (S754).

If "planned write value 1013−sum outflow value>maximum write value 1011" (S754: YES), then the storage controller 140 terminates the procedure without executing a balancing process to satisfy the current avoidance requirement for I/O load balancing (END). This is because, if a balancing process for satisfying the avoidance requirement for I/O load balancing is executed, then the avoidance requirement for write balancing which has been executed previously will cease to be satisfied.

If "planned write value 1013−sum outflow value<maximum write value 1011" (S754: NO), then the storage controller 140 returns to step S751.

Next, a case where the movement type 1602 is "inflow" (S754: inflow) will be described.

The storage controller 140 extracts records 2000 in which the value of the page I/O value division 2011 is smaller than the maximum movement threshold value 1603 of the current parity group 430, from the I/O load characteristics table 306b, and sums up all of the total page write values 2004 of the extracted records 2000 (S755). This value is called the "sum inflow value".

The storage controller 140 refers to the record 1000 of the current parity group 430 in the balance information table 308, and determines whether or not "planned write value 1013+sum inflow value>maximum write value 1011" (S756).

If "planned write value 1013+sum inflow value>maximum write value 1011" (S756: YES), then the storage controller 140 terminates the procedure without executing a balancing process to satisfy the current avoidance requirement for I/O load balancing (END). This is because, if a balancing process for satisfying the avoidance requirement for I/O load balancing is executed, then the avoidance requirement for write balancing which has been executed previously will cease to be satisfied.

In the process described above, the processing (S753 to S754) in the case of an "outflow" parity group 430 may be omitted.

Figure 24:
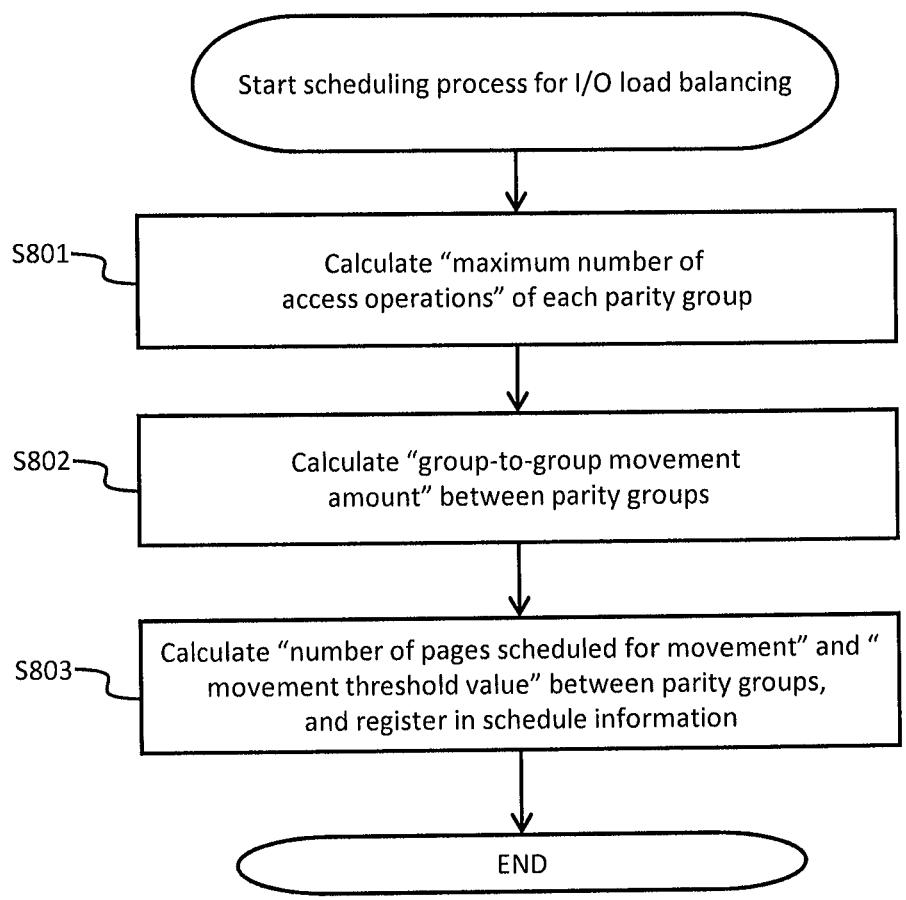
FIG. 24 is a flowchart showing one example of a scheduling process for I/O load balancing.

FIG. 24 is a flowchart showing one example of a scheduling process for I/O load balancing.

The storage controller 140 calculates the maximum I/O value 1012 in the balance information table 308, for each of the parity groups 430 which constitute the pool 420 (S801). The maximum I/O value 1012 is calculated by the following method, for example.

Each of the parity groups 430 has a limit I/O value and a bottleneck coefficient. The limit I/O value is a limit (maximum) of the I/O value which can be received by the parity group 430. The bottleneck coefficient is the maximum value of the operating rate at which the performance of the parity group 430 is stable. The storage controller 140 calculates the maximum I/O value 1012 by "(maximum I/O value)=(limit I/O value)×(bottleneck coefficient)". Alternatively, the storage controller 140 may calculate the maximum I/O value 1012 by "(maximum I/O value)=(sum total of I/O values of pool 420)/(number of parity groups 430 included in pool 420)".

Next, the storage controller 140 calculates the "group-to-group movement amount" between the parity groups 430 (S802). The storage controller 140 may calculate the group-to-group movement amount by the method shown in FIG. 21.

Thereupon, the storage controller 140 calculates the number of pages scheduled for movement 1605 and the movement threshold value 1603, registers these values in the schedule information table 307 (S803), and terminates the process (END). The storage controller 140 may calculate the number of pages scheduled for movement 1605 and the movement threshold value 1603, by the method shown in FIG. 22.

A schedule information table 307 for satisfying an avoidance requirement for I/O load balancing is created by the process described above.

Figure 25:
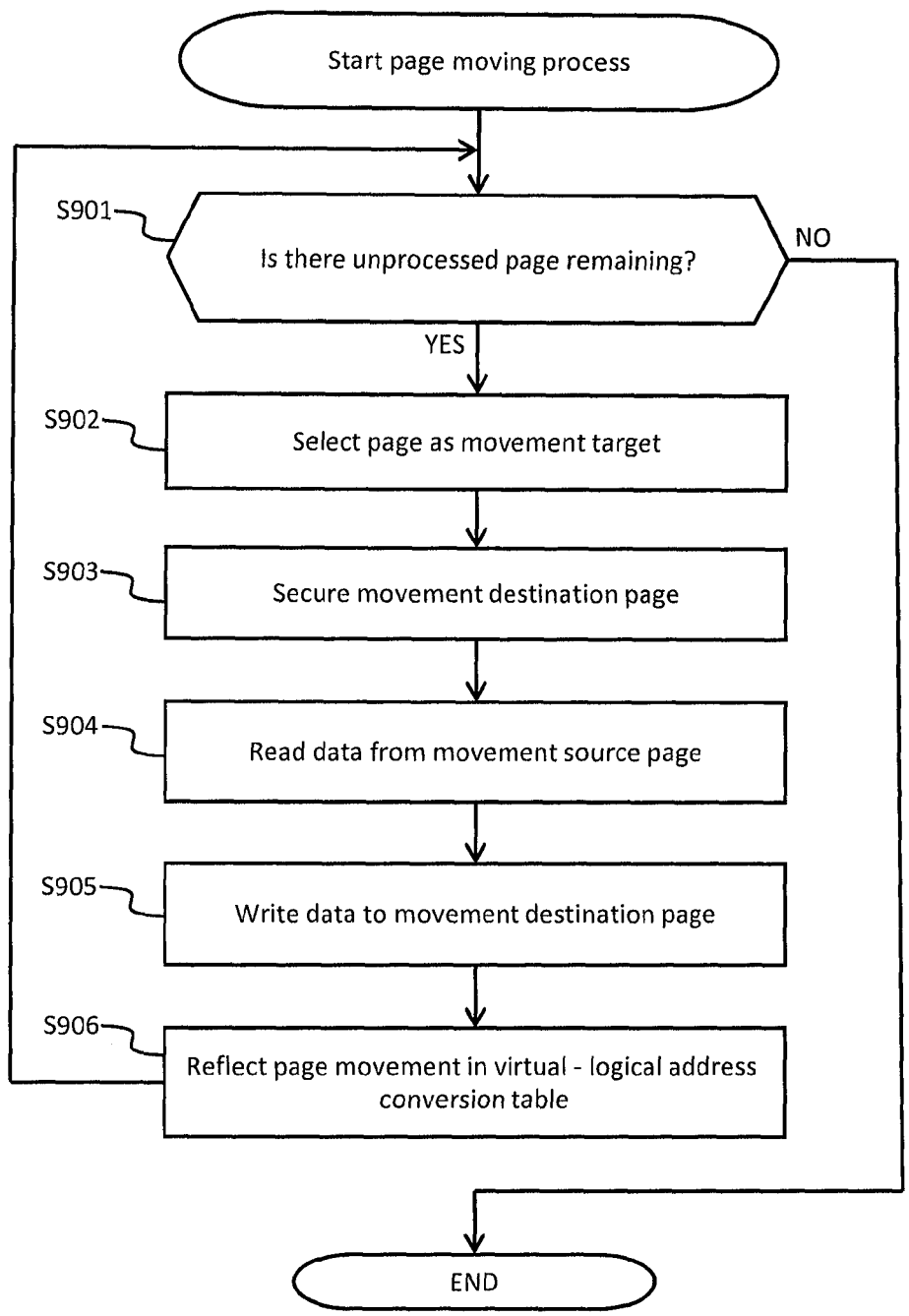
FIG. 25 is a flowchart showing one example of a page moving process.

FIG. 25 is a flowchart showing one example of a page moving process 205.

Below, one example of a page moving process 205 executed by the storage controller 140 is described.

The storage controller 140 moves data stored in a page that is a movement target in the movement source parity group 430, to a prescribed page of the movement destination parity group 430, on the basis of the schedule information table 307. This process is called "page movement".

The storage controller 140 may set a page having a page write value 1302 greater than the minimum movement threshold value 1603 as the movement target, if the movement type 1602 of the parity group 430 is "outflow". The storage controller 140 may set a page having a page write value 1302 smaller than the maximum movement threshold value 1603 as the movement target, if the movement type 1602 of the parity group 430 is "inflow".

The storage controller 140 refers to the schedule information table 307 and determines whether or not there remains an unprocessed page in the movement source (S901). In other words, the storage controller 140 determines whether or not there is a record 1600 in which the number of page scheduled for movement 1605 is less than the number of moved pages 1606.

If there is no unprocessed page remaining in the movement source (S901: NO), then the storage controller 140 terminates the process (END).

If there is an unprocessed page remaining in the movement source (S901: YES), then the storage controller 140 selects a page as a movement target (S902). Pages may be selected individually, one by one, or a plurality of pages may be selected together, as a movement target.

Thereupon, the storage controller 140 selects one movement destination parity group 430 having an unprocessed page, and secures the unused page of the movement destination parity group 430 as a movement destination for the data (S903). The storage controller 140 refers to the logical-physical address conversion table 302, and the like, reads the data stored in the movement source page, and stores the data in the cache memory 144 (S904).

The storage controller 140 refers to the logical-physical address conversion table 302, and the like, and writes the data stored thus far in the cache memory 143, to the movement destination page secured in the movement destination parity group 430 (S905).

The storage controller 140 reflects this page movement in the virtual-logical address conversion table 301 (S906) and returns to step S901.

By the processing described above, it is possible to move data between parity groups 430 so as to satisfy avoidance requirements.

Second Embodiment

In the first embodiment, it is determined not to execute a balancing process for satisfying a certain avoidance requirement if, by executing the balancing process for satisfying that certain avoidance requirement, a previous avoidance requirement having a higher priority order would cease to be satisfied.

In the second embodiment, a balancing process for satisfying a certain avoidance requirement is executed when prescribed conditions are satisfied, even if, by executing the balancing process for satisfying that certain avoidance requirement, a previous avoidance requirement having a higher priority order would cease to be satisfied. Below, the storage system relating to the second embodiment will be described. The hardware configuration of the storage system is as described in relation to FIG. 1.

Figure 26:
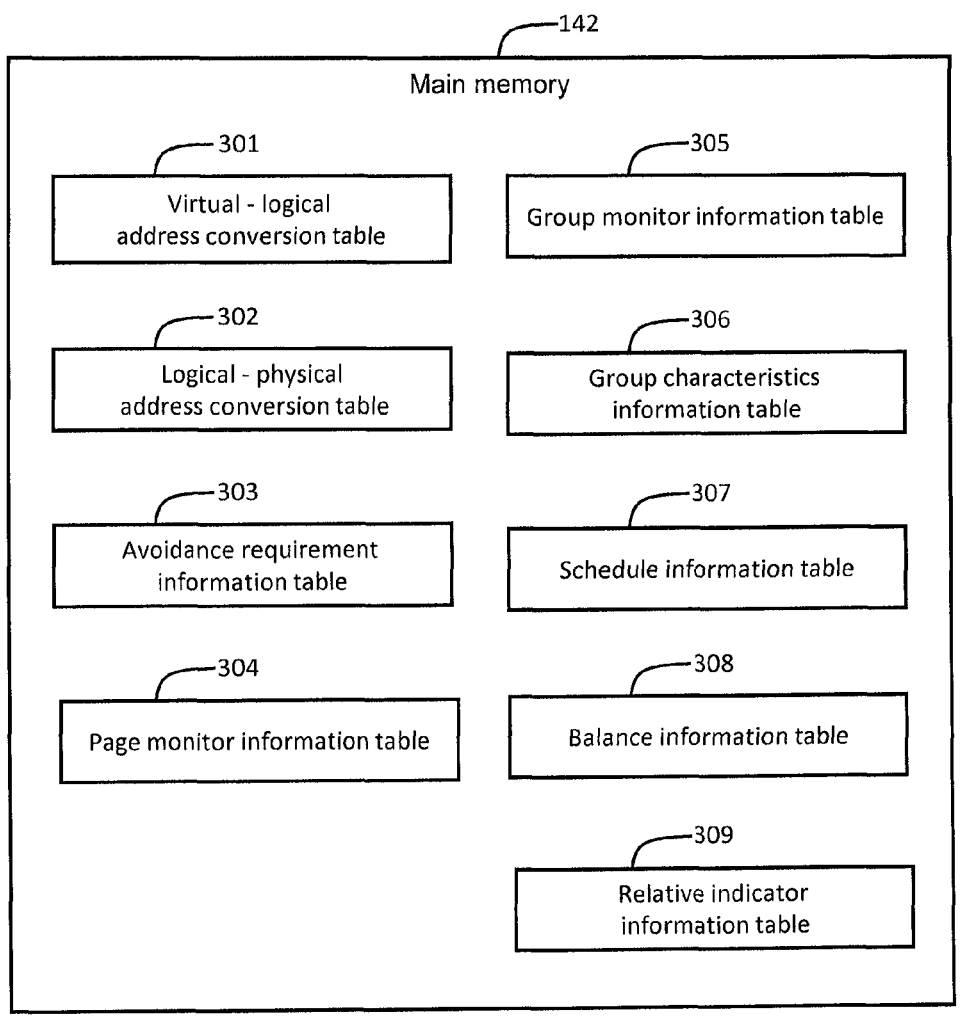
FIG. 26 is a block diagram showing information managed by the storage controller relating to a second embodiment of the invention.

FIG. 26 is a block diagram showing information which is managed by the storage controller 140.

The storage controller 140 manages a virtual-logical address conversion table 301, a logical-physical address conversion table 302, an avoidance requirement information table 303, a page monitor information table 304, a group monitor information table 305, a group characteristics information table 306, a schedule information table 307, a balance information table 308, and a relative indicator information table 309.

The virtual-logical address conversion table 301, the logical-physical address conversion table 302, the avoidance requirement information table 303, the page monitor information table 304, the group monitor information table 305, the group characteristics information table 306, the schedule information table 307 and the balance information table 308 are as described in relation to FIG. 5.

FIG. 27 shows an example of the configuration of the relative indicator information table 309.

The relative indicator information table 309 is used to determine whether or not a balancing process should be executed in order to satisfy the current avoidance requirement. The relative indicator information table 309 has information for determining whether or not the result of carrying out the balancing process for satisfying the current avoidance requirement (for example, I/O load balancing) is in a direction which converges with the result of the balancing process for satisfying the previous avoidance requirement (for example, write balancing).

The relative indicator information table 309 manages one or more relative indicator information 2200 as a record 2200. The items of the relative indicator information 2200 are: a group number 2201, a confirmation flag 2202, a current relative indicator value 2203 and a previous relative indicator value 2204.

The group number 2201 is the same as the group number 505 described previously.

The confirmation flag 2202 stores a flag indicating whether or not it is necessary to make a determination about executing the balancing process for satisfying the current avoidance requirement, in respect of the parity group 430 indicated by the group number 2201. In other words, the confirmation flag 2200 stores a flag indicating whether or not it is necessary to make this determination about execution, in respect of the record 2200 indicated by group number 2201. For example, the value "required" is stored as the confirmation flag 2202 of a record 2200 for which it is necessary to make a determination about execution, and the value "not required" is stored as the confirmation flag 2202 of a record 2200 for which it is not necessary to make a determination about execution.

The relative indicator value calculated by the scheduling process for satisfying the current avoidance requirement is stored in the current relative indicator value 2203.

The relative indicator value calculated by the scheduling process for satisfying the previous avoidance requirement is stored in the previous relative indicator value 2204. In other words, the current relative indicator value 2203 becomes the previous relative indicator value 2204 in the next scheduling process.

The relative indicator value may be calculated as a ratio between the planned value of the plan indicator 1003 in the balance information table 308. For example, the relative indicator value may be calculated by "relative indicator value=(planned I/O value 1014)/(planned write value 1013)" for each parity group 430.

Figure 28:
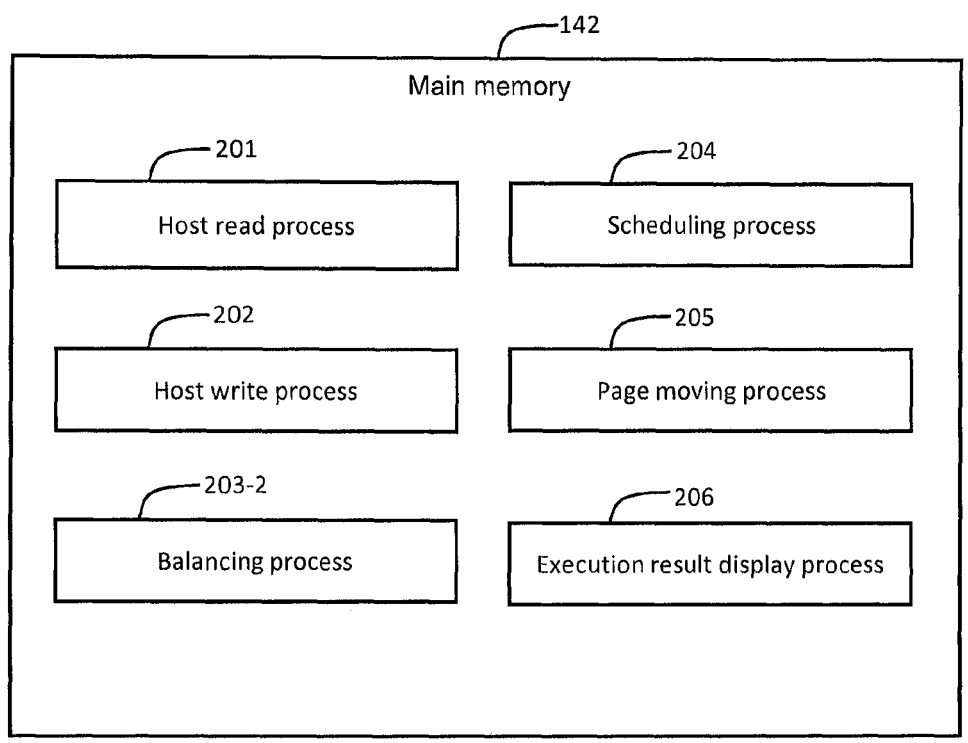
FIG. 28 is a block diagram showing a process which is executed by a storage controller.

FIG. 28 is a block diagram showing processing which is executed by the storage controller 140.

The storage controller 140 can execute a host read process 201, a host write process 202, a balancing process 203-2, a scheduling process 204, a page moving process 205 and an execution result display process 206.

The host read process 201, the host write process 202, the scheduling process 204 and the page moving process 205 are as described in relation to FIG. 15.

With the balancing process 203-2, it is determined to execute a balancing process for satisfying the current avoidance requirement when prescribed conditions are satisfied, even if, by executing the balancing process for satisfying the current avoidance requirement, a previous avoidance requirement having a higher priority order would cease to be satisfied.

With the balancing process 203-2, it may be determined to execute the balancing process for satisfying the current avoidance requirement, if the current relative indicator value 2203 is less than the previous relative indicator value 2204. Furthermore, with the balancing process 203-2, it may be determined to execute the balancing process for satisfying the current avoidance requirement, if "(current relative indicator value 2203+α)<previous relative indicator value 2204" (where α is a prescribed integer). In other words, with the balancing process 203-2, it may be determined to execute the balancing process for satisfying the current avoidance requirement, if the current relative indicator value 2203 is sufficiently smaller than the previous relative indicator value 2204 (shows sufficient convergence).

In the balancing process 203-2, it may be determined to execute the balancing process for satisfying the current avoidance requirement, if all of the records 2200 having a confirmation flag 2202 of "required" have a current relative indicator value 2203 which is less than the previous relative indicator value 2204.

With the balancing process 203-2, it may be determined to execute the balancing process for satisfying the current avoidance requirement, only in respect of a parity group 430 having a confirmation flag 2202 of "required", and in which the current relative indicator value 2203 is less than the previous relative indicator value 2204.

Similarly to the first embodiment, the balancing process 203-2 may be executed by an indication from a management server 130, or may be executed periodically by a storage controller 140.

Figure 29:
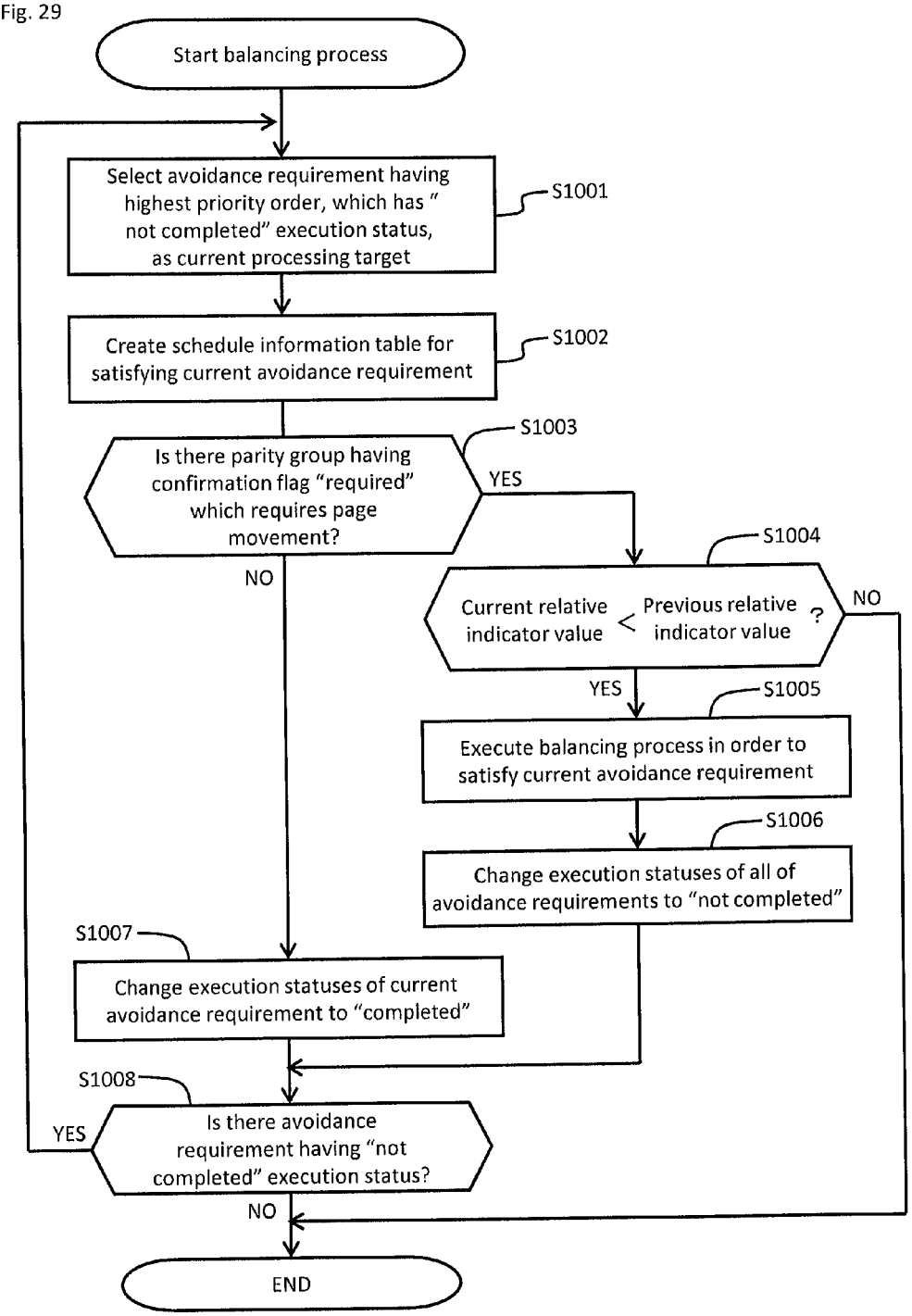
FIG. 29 is a flowchart showing one example of a balancing process.

FIG. 29 is a flowchart showing one example of a balancing process 203-2.

Below, one example of a balancing process 203-2 executed by the storage controller 140 is described.

The storage controller 140 selects the avoidance requirement having the highest priority order 902, for which the execution status 903 is "not completed", as the current processing object (S1001).

The storage controller 140 creates a schedule information table 307 for satisfying the current avoidance requirement (S1002).

The storage controller 140 refers to the relative indicator information table 309 and the schedule information table 307 and determines whether or not there is a parity group 430 for which the confirmation flag 2202 is "required" and which requires page movement (S1003).

If the determination result from step S1003 is negative (S1003: NO), then the storage controller 140 changes the execution status 903 of the current avoidance requirement to "completed" (S1007) and advances to step S1008.

If the determination result of step S1003 is affirmative (S1003: YES), then the storage controller 140 advances to the next process.

Next, the storage controller 140 calculates the current relative indicator value 2203 and determines whether or not the current relative indicator value 2203 is less than the previous relative indicator value 2204 (S1004).

If the current relative indicator value 2203 is equal to or greater than the previous relative indicator value 2204 (S1004: NO), then the storage controller 140 terminates the process (END). This is because there is a possibility that the indicator will not converge if a balancing process for satisfying the current avoidance requirement is executed.

If the current relative indicator value 2203 is less than the previous relative indicator value 2204 (S1004: YES), then the storage controller 140 executes a balancing process for satisfying the current avoidance requirement (S1005). In this balancing process, page movement is carried out between parity groups 430.

The storage controller 140 then changes the execution status 903 of all of the avoidance requirements to "not completed" (S1006), and advances to step S1008. In other words, a balancing process is carried out again, starting from the avoidance requirement having the highest priority order 902.

In step S1008, the storage controller 140 determines whether or not there is an avoidance requirement for which the execution status 903 is "not completed" (S1008), and returns to step S1001 if there is an avoidance requirement which is "not completed" (S1008: YES), and terminates the process (END) if there is no avoidance requirement which is "not completed (S1008: NO).

According to the process described above, if the condition of convergence of the relative indicator value is satisfied, then a balancing process for satisfying the current avoidance requirement is executed.

Figure 30:
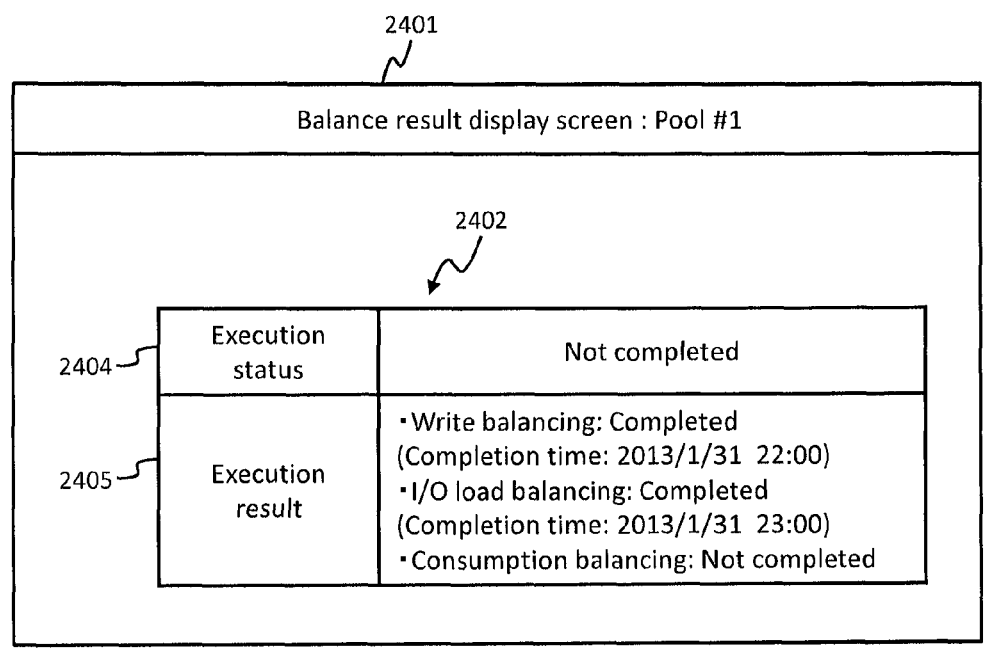
FIG. 30 is a schematic drawing showing one example of a screen which is created by the execution result display process.

FIG. 30 is a schematic drawing showing one example of a screen which is created by the execution result display process 206. The execution result display process 206 creates a screen showing the status and results of execution of the balancing process, and the like, (called an "execution result screen" below) 2401. The execution result display process 206 may create an execution result screen 2401 in accordance with a request from the management server 110. The execution result display process 206 may create the execution result screen 2401 for each pool 420.

An execution status 2404 and an execution result 2405, for example, are displayed on the execution result screen 2401. Information indicating whether or not all balancing processes for satisfying avoidance requirements have been completed in respect of the pool 420 is displayed in the execution status 2404. For example, if all of the balancing processes for satisfying the avoidance requirements have been completed, then "completed" is displayed in the execution status 2404, and if there still remains a balancing process for satisfying an avoidance requirement, then "not completed" is displayed in the execution status 2404.

Information indicating whether or not the balancing processes for satisfying the respective avoidance requirements have been completed is displayed in the execution result 2405. For example, "completed" is displayed in respect of an avoidance requirement that has been completed, and "not completed" is displayed in respect of an avoidance requirement that has not been completed. Furthermore, the time at which the balancing process was completed may be displayed in respect of an avoidance requirement that has been completed.

The storage controller 140 may report a prescribed alert to the host 100 and/or the management server 110, when all of the balancing processes for satisfying the avoidance requirements have been completed and/or when the balancing process for satisfying each avoidance requirement is completed.

Figure 31:
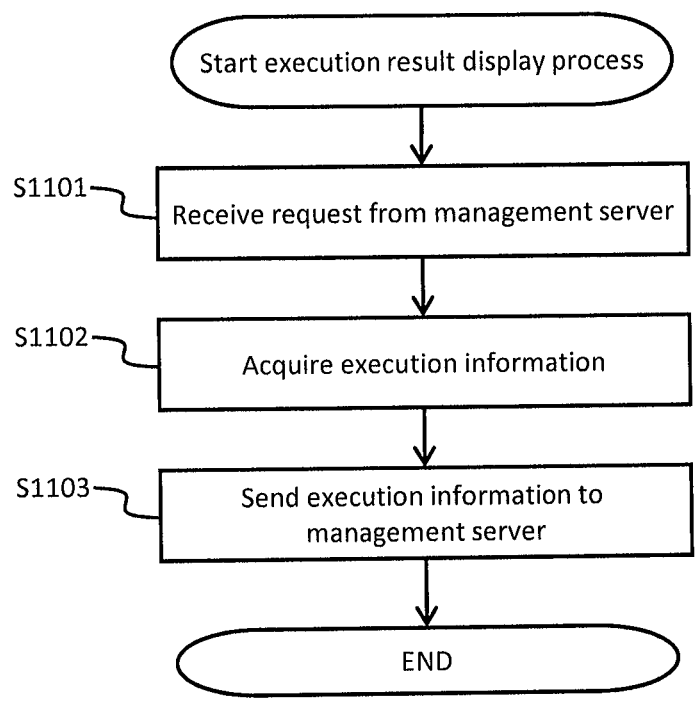
FIG. 31 is a flowchart showing one example of an execution result display process.

FIG. 31 is a flowchart showing one example of an execution result display process 206.

Below, one example of an execution result display process 206 executed by the storage controller 140 is described.

The storage controller 140 receives a request for execution information relating to a balancing process, from the management server 110 (S1101).

The storage controller 140 acquires execution information 900 including the most recent execution status 903 and completion time 904, and the like, relating to each avoidance requirement, from the avoidance requirement information table 303 (S1102).

The storage controller 140 sends the execution information 900 thus acquired to the management server 110 (S1103) and terminates the process (END).

By the process described above, an execution result screen 2401 is displayed on the management server 110.

The embodiments given above are examples for describing the present invention, and it is not intended to limit the invention to these embodiments of the present invention. A person skilled in the art could implement the present invention in various other modes, without departing from the essence of the present invention.

For example, the present invention can also be applied to a pool constituted by a plurality of tiers. Each tier is constituted by a plurality of pages based on a plurality of parity groups having identical or similar performance (and characteristics). The plurality of tiers may include, for example, a tier based on a plurality of SSD groups, a tier based on a plurality of SAS (Serial Attached SCSI) groups, and a tier based on a plurality of SATA (Serial ATA) groups. An SSD group is a parity group constituted by a plurality of SSDs, an SAS group is a parity group constituted by a plurality of SAS-HDDs, and a SATA group is a parity group constituted by a plurality of SATA-HDDs. A plurality of avoidance requirements are associated respectively with one or more tier, of the plurality of tiers. By carrying out data movement between different parity groups, in respect of a tier with which avoidance requirements have been associated, it is possible to satisfy, in parallel fashion, two or more avoidance requirements of the plurality of avoidance requirements which are associated with that tier. A different set of avoidance requirements (a combination of a plurality of avoidance requirements) may be associated with each of the plurality of tiers. For instance, a tier based on storage devices having a limit set on the number of write operations or the number of erasures, such as an SSD, is associated with a life avoidance requirement, at least, whereas a tier which is not subject to a limit of this kind does not have to be associated with a life avoidance requirement.

REFERENCE SIGNS LIST

120 Storage system
140 Storage controller
150 Storage device

The invention claimed is:

1. A storage system to execute a first balancing process and a second balancing process, comprising:
a plurality of storage devices arranged as a plurality of storage device groups, each of the storage device groups including two or more of the storage devices and each of the storage device groups providing a plurality of storage areas; and
a controller which is coupled to the storage devices and is configured to:
store a plurality of limits respectively corresponding to a number of data write operations or data erasure operations for each of the storage devices;
store a plurality of avoidance requirements for avoiding an occurrence of a problem in any of the storage devices including:
a first avoidance requirement for evening out a plurality of I/O values corresponding respectively to the storage device groups, each of the I/O values relating to a respective number of data I/O operations in a respective one of the storage device groups, and
a second avoidance requirement for evening out a plurality of write values corresponding respectively to the storage device groups, each of the write values relating to the respective number of data write operations or data erasure operations in a respective one of the storage device groups;
execute the second balancing process for satisfying the second avoidance requirement and which moves data between the storage areas of different ones of the storage device groups;
determine whether or not to execute the first balancing process for satisfying the first avoidance requirement after executing the second balancing process on the basis of the second avoidance requirement being satisfied by the second balancing process executed prior to the first balancing process for satisfying the first avoidance requirement; and
execute the first balancing process which moves data between the storage areas of different ones of the storage device groups while a result of the determination is affirmative, and the result of the determination is affirmative when the second avoidance requirement is satisfied while the first balancing process is executed.

2. The storage system according to claim 1, wherein the controller is configured to:
not execute the first balancing process when the result of the determination is negative, and the result of the determination is negative when the second avoidance requirement ceases to be satisfied while the first balancing process is executed.

3. The storage system according to claim 2, wherein the result of the determination is negative when the write value relating to one of the storage device groups becomes greater than a threshold value specified by the second avoidance requirement while the first balancing process is executed, and wherein the threshold value is based on the limit on the number of data write operations or erasure operations in the plurality of storage devices which constitute the one of the storage device groups.

4. The storage system according to claim 3,
wherein the controller is configured to:
manage an I/O frequency with respect to each of the plurality of storage areas; and
preferentially set as a movement source storage area having an I/O frequency higher than a predetermined I/O frequency from among the storage areas which belong to one of the storage device groups in the first balancing process.

5. The storage system according to claim 2,
wherein the controller is configured to:
repeatedly execute the second balancing process and the first balancing process; and
compare a previous indicator calculated on the basis of a write value relating to a previous second balancing process and an I/O value relating to a previous first balancing process with a current indicator calculated on the basis of a write value relating to a current second balancing process and an I/O value relating to a current first balancing process, and determine to stop executing the current first balancing process when the current indicator is greater than the previous indicator,
the previous indicator and the current indicator respectively being values relating to ratios of the write values and the I/O values.

6. The storage system according to claim 1, wherein the result of the determination is negative when the write value relating to one of the storage device groups becomes greater than a threshold value specified by the second avoidance requirement while the first balancing process is executed, and the threshold value is based on the limit on the number of data write operations or erasure operations in the plurality of storage devices which constitute the one of the storage device groups.

7. The storage system according to claim 6,
wherein the controller is configured to:
manage an I/O frequency with respect to each of the plurality of storage areas; and
preferentially set as a movement source storage area having an I/O frequency higher than a predetermined I/O frequency from among the storage areas which belong to one of the storage device groups in the first balancing process.

8. A storage control method for a storage system which includes a plurality of storage devices arranged as a plurality of storage device groups, each of the storage device groups including two or more of the storage devices and each of the storage device groups providing a plurality of storage areas, and a controller which is coupled to the storage devices and is programmed to execute a first balancing process and a second balancing process, the storage control method comprising the steps of:

storing a plurality of limits respectively corresponding to a number of data write operations or data erasure operations for each of the storage devices;

storing a plurality of avoidance requirements for avoiding an occurrence of a problem in any of the storage devices including:

a first avoidance requirement for evening out a plurality of I/O values corresponding respectively to the storage device groups, each of the I/O values relating to a respective number of data I/O operations in a respective one of the storage device groups, and a second avoidance requirement for evening out a plurality of write values corresponding respectively to the storage device groups, each of the write values relating to the respective number of data write operations or data erasure operations in a respective one of the storage device groups;

executing the second balancing process for satisfying the second avoidance requirement and which moves data between the storage areas of different ones of the storage device groups;

determining whether or not to execute the first balancing process for satisfying the first avoidance requirement after executing the second balancing process on the basis of the second avoidance requirement being satisfied by the second balancing process executed prior to the first balancing process for satisfying the first avoidance requirement; and executing the first balancing process which moves data between the storage areas of different ones of the storage device groups while a result of the determination is affirmative, and the result of the determination is affirmative when the second avoidance requirement is satisfied while the first balancing process is executed.

* * * * *